US008328623B2

(12) United States Patent
Stern et al.

(10) Patent No.: US 8,328,623 B2
(45) **Date of Patent: *Dec. 11, 2012**

(54) APPARATUS AND METHOD FOR MEMORIZATION POKER

(75) Inventors: Kenneth O. Stern, Reno, NV (US); Richard E. Michaelson, Reno, NV (US); Michael Wishart, Reno, NV (US)

(73) Assignee: IGT, Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 13/281,713

(22) Filed: Oct. 26, 2011

(65) Prior Publication Data

US 2012/0040730 A1 Feb. 16, 2012

Related U.S. Application Data

(63) Continuation of application No. 12/023,961, filed on Jan. 31, 2008, now Pat. No. 8,062,119, which is a continuation of application No. 10/638,875, filed on Aug. 11, 2003, now abandoned.

(51) Int. Cl.
*A63F 9/24* (2006.01)
*A63F 13/00* (2006.01)

(52) U.S. Cl. ................ 463/20; 463/11; 463/12; 463/13; 463/16

(58) Field of Classification Search .............. 463/11-13, 463/16-22
See application file for complete search history.

(56) References Cited

U.S. PATENT DOCUMENTS 821,781 A 5/1906 Cadwallader
1,551,761 A * 9/1925 McCarroll .................... 273/304
1,568,206 A 1/1926 Brandt
1,681,683 A 8/1928 Ramer
2,545,644 A 3/1951 Benton
3,831,945 A 8/1974 Scherini
4,157,829 A 6/1979 Goldman et al.
4,170,358 A 10/1979 Hancock
4,198,052 A 4/1980 Gauselmann
(Continued)

FOREIGN PATENT DOCUMENTS

EP 0 410 789 7/1990
(Continued)

OTHER PUBLICATIONS

Caribbean Poker Game Description, printed from www.gambling.org (website) on Feb. 17, 2003.

(Continued)

*Primary Examiner* — Peter DungBa Vo
*Assistant Examiner* — Jasson Yoo
(74) *Attorney, Agent, or Firm* — Neal, Gerber & Eisenberg LLP

(57) ABSTRACT

New apparatuses and methods for introducing varying levels of skill into wagering games that have historically been games of luck or strategy are provided. A card value and suit is invisible or hidden to a player initially and associated with a value and suit dealt to the player. The game enables the player to elect to display the associated value and suit. If the player exercises the option, the associated value and suit is displayed and a poker or blackjack evaluation is made based on the displayed associated value and suit. In various embodiments, the same associations are maintained for a single hand or play, multiple hands or plays or on a long term fixed basis. Associated symbols are also implemented with the game of slot.

26 Claims, 16 Drawing Sheets

U.S. PATENT DOCUMENTS 4,335,809 A 6/1982 Wain
4,339,798 A 7/1982 Hedges et al.
4,467,424 A 8/1984 Hedges et al.
4,494,197 A 1/1985 Troy et al.
4,560,161 A 12/1985 Hamano
4,582,324 A 4/1986 Koza et al.
4,618,150 A 10/1986 Kimura
4,652,998 A 3/1987 Koza et al.
4,669,730 A 6/1987 Small
4,689,742 A 8/1987 Troy et al.
4,743,022 A 5/1988 Wood
4,805,907 A 2/1989 Hagiwara
4,815,741 A 3/1989 Small
4,817,951 A 4/1989 Crouch et al.
4,838,552 A 6/1989 Hagiwara
4,842,278 A 6/1989 Markowicz
4,856,787 A 8/1989 Itkis
4,926,327 A 5/1990 Sidley
4,982,337 A 1/1991 Burr et al.
5,019,973 A 5/1991 Wilcox et al.
5,042,809 A 8/1991 Richardson
5,085,436 A 2/1992 Bennett
5,092,598 A 3/1992 Kamille
5,100,137 A 3/1992 Fulton
5,158,293 A 10/1992 Mullins
5,167,413 A 12/1992 Fulton
5,209,479 A 5/1993 Nagao et al.
5,211,399 A 5/1993 Howard
5,251,897 A 10/1993 Fulton
5,255,915 A 10/1993 Miller
5,265,874 A 11/1993 Dickinson et al.
5,276,312 A 1/1994 McCarthy
5,282,620 A 2/1994 Keesee
5,308,065 A 5/1994 Bridgeman et al.
5,324,035 A 6/1994 Morris et al.
5,356,140 A 10/1994 Dabrowski et al.
5,364,100 A 11/1994 Ludlow et al.
5,393,061 A 2/1995 Manship et al.
5,395,111 A 3/1995 Inoue
5,398,932 A 3/1995 Eberhardt et al.
5,407,199 A 4/1995 Gumina
5,411,257 A 5/1995 Fulton
5,411,271 A 5/1995 Mirando
5,429,507 A 7/1995 Kaplan
5,437,451 A 8/1995 Fulton
5,489,101 A 2/1996 Moody
5,525,915 A 6/1996 Farquhar et al.
5,531,448 A 7/1996 Moody
5,542,669 A 8/1996 Charron et al.
5,628,684 A 5/1997 Bouedec
5,630,754 A 5/1997 Rebane
5,655,965 A 8/1997 Takemoto et al.
5,664,781 A 9/1997 Feola
5,674,128 A 10/1997 Holch et al.
5,722,891 A 3/1998 Inoue
5,732,950 A 3/1998 Moody
5,752,881 A 5/1998 Inoue
5,755,621 A 5/1998 Marks et al.
5,769,716 A 6/1998 Saffari et al.
5,779,545 A 7/1998 Berg et al.
5,800,269 A 9/1998 Holch et al.
5,807,172 A 9/1998 Piechowiak
5,816,916 A 10/1998 Moody
5,823,873 A 10/1998 Moody
5,833,536 A 11/1998 Davids et al.
5,871,398 A 2/1999 Schneier et al.
5,890,962 A 4/1999 Takemoto
5,919,089 A 7/1999 Rosati
5,944,606 A 8/1999 Gerow
5,947,821 A 9/1999 Stone
5,949,042 A 9/1999 Dietz, II et al.
5,954,582 A 9/1999 Zach
5,984,781 A 11/1999 Sunaga
5,997,401 A 12/1999 Crawford
6,007,066 A 12/1999 Moody
6,015,346 A 1/2000 Bennett
6,017,032 A 1/2000 Grippo et al.
6,024,640 A 2/2000 Walker et al.
6,045,129 A 4/2000 Cooper et al.
6,086,066 A 7/2000 Takeuchi et al.
6,089,976 A 7/2000 Schneider et al.
6,089,982 A 7/2000 Holch et al.
6,098,985 A 8/2000 Moody
6,110,040 A 8/2000 Sanduski et al.
6,120,378 A 9/2000 Moody
6,126,542 A 10/2000 Fier
6,132,311 A 10/2000 Williams
6,142,874 A 11/2000 Kodachi et al.
6,146,272 A 11/2000 Walker et al.
6,149,521 A 11/2000 Sanduski
6,159,095 A 12/2000 Frohm et al.
6,159,098 A 12/2000 Slomiany et al.
6,168,521 B1 1/2001 Luciano et al.
6,174,233 B1 1/2001 Sunaga et al.
6,176,781 B1 1/2001 Walker et al.
6,183,361 B1 2/2001 Cummings et al.
6,190,254 B1 2/2001 Bennett
6,190,255 B1 2/2001 Thomas et al.
6,200,217 B1 3/2001 Osawa
6,203,428 B1 3/2001 Giobbi et al.
6,210,275 B1 4/2001 Olsen
6,210,276 B1 4/2001 Mullins
6,213,875 B1 4/2001 Suzuki
6,217,448 B1 4/2001 Olsen
6,220,961 B1 4/2001 Keane et al.
6,224,484 B1 5/2001 Okuda et al.
6,227,970 B1 5/2001 Shimizu et al.
6,234,897 B1 5/2001 Frohm et al.
6,238,287 B1 5/2001 Komori et al.
6,241,606 B1 6/2001 Riendeau et al.
6,241,607 B1 6/2001 Payne et al.
6,251,013 B1 6/2001 Bennett
6,254,480 B1 7/2001 Zach
6,261,177 B1 7/2001 Bennett
6,270,408 B1 8/2001 Sakamoto et al.
6,273,820 B1 8/2001 Haste, III
6,280,328 B1 8/2001 Holch et al.
6,287,194 B1 9/2001 Okada et al.
6,290,600 B1 9/2001 Glasson
6,299,165 B1 10/2001 Nagano
6,309,298 B1 10/2001 Gerow
6,309,300 B1 10/2001 Glavich
6,315,663 B1 11/2001 Sakamoto
6,315,664 B1 11/2001 Baerlocher et al.
6,319,124 B1 11/2001 Baerlocher et al.
6,325,716 B1 12/2001 Walker et al.
6,334,613 B1 1/2002 Yoseloff
6,342,007 B1 1/2002 Wood et al.
6,346,043 B1 2/2002 Colin et al.
6,347,996 B1 2/2002 Gilmore et al.
6,358,151 B1 3/2002 Enzminger et al.
6,368,218 B2 4/2002 Angell, Jr.
6,398,644 B1 6/2002 Perrie et al.
6,402,614 B1 6/2002 Schneier et al.
6,413,162 B1 7/2002 Baerlocher et al.
6,419,579 B1 7/2002 Bennett
6,419,583 B1 7/2002 Crumby et al.
6,443,837 B1 9/2002 Jaffe et al.
6,450,885 B2 9/2002 Schneier et al.
6,454,648 B1 9/2002 Kelly et al.
RE37,885 E 10/2002 Acres et al.
6,475,086 B2 11/2002 Zach
6,508,711 B1 1/2003 Ono
6,524,184 B1 2/2003 Lind et al.
6,527,638 B1 3/2003 Walker et al.
6,533,279 B2 3/2003 Moody et al.
6,533,664 B1 3/2003 Crumby
6,537,150 B1 3/2003 Luciano et al.
6,729,955 B2 5/2004 Bennett et al.
6,773,012 B1 8/2004 French
7,252,591 B2 8/2007 Van Asdale
8,062,119 B2 * 11/2011 Stern et al. ...................... 463/20
2002/0010013 A1 1/2002 Walker et al.
2002/0037761 A1 3/2002 Bennett
2002/0072404 A1 6/2002 Gerow
2002/0094857 A1 7/2002 Meyer
2002/0098882 A1 7/2002 Lind et al.

| | | | | |
|---|---|---|---|---|
| 2002/0098883 | A1 | 7/2002 | Packes, Jr. et al. | |
| 2002/0119814 | A1 | 8/2002 | Fong et al. | |
| 2002/0169018 | A1 | 11/2002 | Schneier et al. | |
| 2003/0078092 | A1 * | 4/2003 | Bennett | 463/20 |
| 2003/0171143 | A1 | 9/2003 | Valdez et al. | |
| 2004/0004324 | A1 * | 1/2004 | Stefan | 273/292 |
| 2004/0009803 | A1 | 1/2004 | Bennett et al. | |

FOREIGN PATENT DOCUMENTS

| | | | |
|---|---|---|---|
| GB | 424618 | | 11/1933 |
| GB | 471403 | | 9/1937 |
| GB | 2 056 289 | | 3/1981 |
| GB | 2 253 300 | | 2/1992 |
| GB | 2 347 088 | | 8/2000 |
| JP | 2000-300848 | A | 10/2000 |
| WO | WO 93/03464 | | 2/1993 |
| WO | WO 2004/012161 | | 2/2004 |

OTHER PUBLICATIONS

Concentration Game Show descriptions, printed from various websites on Jun. 22, 2003.

Diamonopoly Advertisement, written by International Gamco, Inc., published in 2002.

Enchanted Unicorn Advertisement, written by IGT, published in 2001.

Free Ride Game Description and Rules, printed from www.play-free-ride.com (website) on Feb. 17, 2003.

Hoyle's Rules of Games—Poker Description, written by Morehead and Mott-Smith, published in 1983.

Instant Winner Advertisement, written by Williams/WMS Gaming, published prior to 2002.

Lucky Times California Lottery Newsletter, published in 1996.

Penguin Pays Article, written by Strictly Slots, published in Apr. 1999.

Pick'em Poker Plus Advertisement, written by Bally Gaming Systems, published in 2002.

Play it again Advertisement, written by International Gamco, Inc., published in 2000.

Slot Machines Article, written by Marshall Fey, published in 1983.

Super Cherry Advertisement, written by IGT, published in 2001.

Third Party Submission in Published Application Under 37 C.F.R. § 1.99 filed for U.S. Appl. No. 13/281,713, dated Apr. 16, 2012 (2 pages).

Partially-highlighted JP 2000-300848A and English translation of Abstract and paragraph [0036] of same submitted with Third Party Submission in Published Application Under 37 C.F.R. § 1.99 for U.S. Appl. No. 13/281,713 (5 pages), Publication Date: Oct. 31, 2000.

Partially-highlighted U.S. Patent No. 6,729,955 submitted with Third Party Submission in Published Application Under 37 C.F.R. § 1.99 for U.S. Appl. No. 13/281,713 (3 pages), Publication Date May 4, 2004.

* cited by examiner

FIG. 5

VARIATIONS ON DISPLAY OF FIGS. 4A AND 4B FOR DRAW POKER

VARIATION 1- PLAYER CAN SELECT TO CHANGE DISPLAYED CARD 60a WITH HIDDEN CARD 70a AND CAN/CANNOT THEREAFTER REPLACE 70a WITH A DRAW CARD.

VARIATION 2- PLAYER CAN OR CANNOT SELECT CARD 60a TO BE REPLACED WITH A DRAW CARD.

VARIATION 3- IF PLAYER SELECTS TO SEE CARD 70a, PLAYER CANNOT CHOOSE TO REPLACE CARDS 60b TO 60e WITH DRAWS OR SOME PERCENTAGE THEREOF. 70a COULD BE EXTRA CARD.

VARIATION 4- DIFFERENT AMOUNTS OF CARDS OF SET 60 ARE PROVIDED, FOR EXAMPLE, FOR SEVEN CARD DRAW POKER.

VARIATION 5- ONE OR MORE CARD VALUES OF DISPLAYED CARDS 60 IS WILD, HIDDEN CARD 70a MAY OR MAY NOT BE WILD.

VARIATION 6- ONE OR MORE DRAW CARDS CAN/CANNOT BE A MULTI-FACED CARD 80.

VARIATION 7- BUY A PEEK.

VARIATION 8- ONE OR MORE DRAW CARDS 60b TO 60e IS DEALT FACE DOWN .

FIG. 7

VARIATIONS ON GAMES FROM FIGS. 6A AND 6B FOR DRAW POKER

VARIATION 1- CAN SELECT ONE, OR MORE OR ALL OF MULTI-FACED CARDS 80a TO 80c (80c TO 80e) .

VARIATION 2- IF SELECT A MULTI-FACE CARD 80a TO 80c, CAN/CANNOT REPLACE THEREAFTER HIDDEN CARDS 70a TO 70c WITH A DRAW CARD.

VARIATION 3- CAN/CANNOT REPLACE A MULTI-FACED CARD 80a TO 80c WITH A DRAW CARD.

VARIATION 4- IF SELECT TO SEE ONE OR MORE HIDDEN CARDS 70a TO 70c, CANNOT SELECT TO REPLACE ONE OR BOTH OF CARDS 60d AND 60e WITH DRAW CARDS.

VARIATION 5- DIFFERENT AMOUNTS OF MULTI-FACED CARDS 80 AND DISPLAYED CARDS 60 ARE PROVIDED, FOR EXAMPLE, FOR SEVEN CARD DRAW POKER.

VARIATION 6- ONE OR MORE VALUES IS WILD, HIDDEN CARD VALUES 70a TO 70c MAY/MAY NOT BE WILD.

VARIATION 7- ONE OR MORE CARDS 60d OR 60e IS DEALT FACE DOWN.

VARIATION 8- ONE OR MORE DRAW CARDS CAN/CANNOT BE MULTI-FACED CARD 80 .

VARIATION 9- ONE OR MORE BUY A PEEK .

FIG. 9

VARIATIONS ON BLACKJACK GAMES

VARIATION 1- VALUE OF HIDDEN CARD 70e IS ADDED TO PLAYER'S TOTAL IN PLACE OF/IN ADDITION TO VALUE OF DISPLAYED CARD 60e.

VARIATION 2- HIDDEN CARD 70e CAN/CANNOT BE ACTIVATED TO REVERSE A BUST CAUSED BY CARD 60e.

VARIATION 3- ACTIVATION OF HIDDEN CARD 70e YIELDS AUTOMATIC STICK, SIMILAR TO SINGLE CARD ON A DOUBLE DOWN, SO THAT PLAYER CANNOT HAVE ANOTHER HIT.

VARIATION 4- ONE OR BOTH CARDS 60a AND 60c IS ALTERNATIVELY A MULTI-FACED CARD OPERATING IN ASSOCIATION WITH HIDDEN CARDS 70a AND 70c, RESPECTIVELY, AS OPPOSED TO OR IN ADDITION TO CARD 80e.

VARIATION 5- DEALER GETS ONE OR MORE MULTI-FACED CARDS.

VARIATION 6- CAN/CANNOT SPLIT MULTI-FACE CARDS.

VARIATION 7- IF GET MULTI-FACE CARD ON DOUBLE-DOWN, HIDDEN CARD IS AUTO-ACTIVATED TO REPLACE/ ADD TO TOTAL OR PLAYER CAN/CANNOT CHOOSE TO REPLACE/ADD HIDDEN CARD.

VARIATION 8- SEE HIDDEN CARD FOR A PRICE, MULTIPLE PEEK OPPORTUNITIES IF HAVE MULTIPLE MULTI-FACED CARDS .

FIG. 11

VARIATIONS ON SLOT GAMES

VARIATION 1- ONLY ACTIVATE HIDDEN SYMBOL 170 ON ACTIVE PAYLINE .

VARIATION 2- BONUS EMBODIMENT- ACTIVATION OF HIDDEN SYMBOL 170 ACTIVATES INACTIVE PAYLINE.

VARIATION 3- CAN/CANNOT ACTIVATE MULTIPLE HIDDEN SYMBOLS ON A PAYLINE.

VARIATION 4- A WIN INCREASE DUE TO HIDDEN SYMBOL 170 ACTIVATION IS PAID IN ADDITION TO/IN PLACE OF WIN WITHOUT HIDDEN SYMBOL.

VARIATION 5- HIDDEN SYMBOL ASSOCIATIONS SHOWN IN PAY TABLE.

FIG. 14

VARIATIONS ON TABLE GAMES

VARIATION 1- DRAW POKER PLAYED IN ANY MANNER DESCRIBED ABOVE IN CONNECTION WITH FIGS. 4 TO 7 .

VARIATION 2- STUD POKER: INCLUDING CARIBBEAN POKER IN WHICH THE PLAYER CAN ACTIVATE A HIDDEN CARD 274 BEFORE/AFTER PLACING THE "CALL BET", PLAYER COULD ALSO SEE HIDDEN CARD 274 AFTER THE DEALER SHOWS DEALER'S HAND.

VARIATION 3- LET IT RIDE POKER: PLAYER CAN ACTIVATE HIDDEN CARD BEFORE ONE OR BOTH OF 1ST COMMUNITY CARD IS REVEALED OR SECOND COMMUNITY CARD IS REVEALED AND/OR AFTER SECOND COMMUNITY CARD IS REVEALED. ONE OR BOTH COMMUNITY CARDS CAN ALTERNATIVELY BE MULTI-FACED CARD.

FIG. 15

DURATION OF ASSOCIATIONS

VARIATION 1 - SINGLE PLAY

VARIATION 2 - MULTIPLE PLAY

VARIATION 3 - KEEP ASSOCIATIONS UNTIL EVENT OCCURS

VARIATION 4 - LONG TERM

APPARATUS AND METHOD FOR MEMORIZATION POKER

PRIORITY CLAIM

This application is a continuation of, and claims priority to and the benefit of, U.S. patent application Ser. No. 12/023,961, filed on Jan. 31, 2008, which is a continuation of, and claims priority to and the benefit of, U.S. patent application Ser. No. 10/638,875, filed on Aug. 11, 2003, now abandoned, the entire contents of each of which are incorporated herein by reference.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates generally to gaming devices and more specifically to the wagering games requiring player inputs.

Wagering machines in most jurisdictions are games of luck, not skill. For instance, slot machines owe at least some of their popularity to the fact that an amateur, novice or inexperienced player can play most slot machines at the player's own pace, with no required skills, strategy (or very little strategy) or risk evaluation and perform as well as the seasoned or experienced game player. Most slot machines are set to pay back on average between eighty and ninety-nine percent of the amount that the player's wager. These payouts are randomly determined. Nevertheless, players constantly try to inject skill, know-how or strategy into gaming devices with the hope of turning the odds in their favor.

Other gaming devices include luck and a fair amount of strategy or knowledge of the game. Video poker and blackjack are two games that require luck and strategy. The player is lucky to receive four aces in poker. The player should also know that is unwise to forgo three-of-a-kind to play for a straight in poker or split two ten's in blackjack.

Certain wagering gaming devices are required to involve skill or dexterity. These games cannot turn purely upon the luck of the player. Skill games present certain general problems to the game implementor. First, skill games can be mastered by players having a high level of skill, a lot of practice or both. Second, to combat mastering, gaming device manufacturers may have to make the skill game relatively difficult for the economics to work. The difficulty level may be too great for average players to experience a sufficient level of success and enjoyment.

Skill games, on the other hand, are interactive and typically enjoyable to play. A need exists therefore for a different, interactive and enjoyable game that can be played requiring skill. A need also exists for a method of controlling a payout in a wagering game having skill so that the game is relatively easy to win and enjoy and at the same time economical and fiscally controllable, predictable and repeatable for the casino.

SUMMARY OF THE INVENTION

The present invention provides an apparatus and method for introducing varying levels of skill into wagering games that have historically been games of luck or chance. To that end, the present invention provides a memorization element that is implemented into various wagering games, such as video poker, blackjack and slot. The implementation is via a gaming device or live casino game.

In connection with poker, for example, the wagering game includes a deck of cards such as conventional deck of fifty-two cards. Each card of the deck has multiple characteristics, such as a conventional deck, wherein each card includes a suit and value combination, e.g., a seven of hearts or king of spades. Each card also includes a masked or hidden suit and value combination. For example, the seven of hearts card could be associated with the hidden or masked suit and value of the ace of diamonds. In one embodiment, the first or original suit and value is selected from a first set of cards or deck of cards. In another embodiment, the masked or hidden suit and value is selected from a second set or deck of cards.

As used herein, the term "set" of cards is broader than "deck" of cards. A deck is typically fifty-two cards, thirteen each from the suits of spades, clubs, diamonds and hearts. A deck can also include one or more jokers. A set includes a number or cards that is equal to, less than or more than the cards provided in a standard deck.

The present invention provides a variety of different memorization games using the associated symbol or symbol combinations. In one embodiment, every card in a deck of cards has a first value and suit combination, which is visible when the card is turned face up and a second value and suit combination, associated with the first combination, which is not visible until selected by the player. The memorization game is played with draw poker where the player typically exchanges all five cards (sometimes requiring one card to be an ace). The known draw poker game is then modified so that the player either: (i) keeps a card as dealt; (ii) exchanges a card as is done in known draw poker; or (iii) replaces a first value and suit of one of the cards with its associated second value and suit (assuming the player remembers the associated second value and suit to be desirable).

In stud poker, the game allows the player an option to exchange the first value and suit combination with the associated second value and suit combination for one of, a plurality of or all of either the stud cards (dealt typically face up). Other poker embodiments are explained below.

In blackjack, the player decides to take a "hit", namely, to receive an additional card, the value of which is added to the player's total towards twenty-one. Alternatively or additionally, the player in the present invention elects to exchange the first value and suit combination of a dealt card for an associated second value and suit combination. The first value is subtracted from the player's total, while the second value is added to the player's total. In an alternative embodiment, the second value is added to the blackjack total but the first value is not subtracted. Other blackjack variations are discussed below.

In slot, second symbols (not displayed) are associated with first symbols that are displayed after a reel spin. With slot, the gaming device provides one or more displayed symbols that have associated second symbols. On an active payline, for example, the player changes the displayed symbol, e.g., by touching such symbol, so that an associated second symbol is displayed instead. Such changing may create a winning combination along the active payline that did not exist previously or upgrade an existing win that did exist previously. Other slot variations are discussed below.

In the above-described embodiments, the player is generally provided with an option to exchange or add or not exchange or add the associated combination or symbol. The decision is based largely on: (i) having an opportunity to exchange or add the associated symbol (e.g., option provided only if on active payline or only one time per poker hand); (ii) whether the player remembers that a displayed symbol or combination has an associated second symbol (e.g., in deck of cards only certain cards have associated values and suits, and player must remember such cards); (iii) assuming the player remembers that a displayed symbol or combination has an associated second symbol, whether the player remembers what the associated symbol is; and (iv) assuming that the first three conditions are satisfied, whether it makes sense to add or exchange a displayed symbol or combination with an associated symbol or combination.

With poker or blackjack, the present invention is implemented in video or live form. If played as a casino table game at least two sets or decks of cards are used, one normal deck (face and covered back) and one association deck (face and face). The association deck includes cards displaying on one side one of each of the first combinations of values and suits that are displayed likewise individually on the faces of the cards of the normal set or deck. On the other side of the cards of the association deck are the second, associated combination of values and suits. The association deck is laid out so that the player and house can see the first combinations of values and suits but not the associated second combinations.

Depending upon whether a poker evaluation is made via adding the associated card or replacing the first card with the associated card, the dealer when asked either flips and adds the association card to the player's total or flips and replaces the initially dealt card with the association card. Thereafter, a poker evaluation is made based, at least in part, on the value and suit of the association card. A similar table game for blackjack is discussed below.

The second suit and number combinations are associated with the cards or the first suit and number combinations in a variety of ways, i.e., for a variety of amounts of time or plays. In one embodiment, the associations last for a single play, e.g., a single hand, a single blackjack game, a single spin of the reels, etc. In that single hand embodiment, the player's ability to memorize the associations (second combination based on the first combination) is limited. The single hand or play embodiment is mainly a game of luck.

In another embodiment, the associations last for a multiple plays, for example, e.g., for multiple hands of poker, multiple blackjack games, multiple spins of slot machine reels or until an event occurs, such as the player cashing out or running out of tokens. In the event the player runs out of tokens, the gaming device can maintain the associations for a given time period such as one minute, to enable the player to reinsert additional coins or tokens. In another example, the same associations are maintained until a player removes the player's tracking card from the machine. The multiple play embodiment provides a game with many dynamics. First, it injects a level of skill into games that are games of luck (slot) and luck and strategy (poker and blackjack). Second the ability to make associations provide an incentive for the player to continue gaming.

In a further embodiment, the associations are long term, e.g., remain constant as long as the gaming device sits on the floor or for the foreseeable future in table gaming. For a table game, the associations can last, for example, until a deck of cards becomes worn. A new deck then has different associations (although new decks can have the same associations alternatively). With slot, the associations last until a new game is installed, a software update is made or until a new game is downloaded into an existing memory device in various embodiments. The length of the long term or other associations may be randomly determined or predetermined.

The long term associations inject a relatively high amount of skill into the games of luck and strategy. It would be possible for a player playing such a game to completely memorize the associations or even to have a crib sheet setting forth the combinations. The key in the long term association game is recognition of the fact that the payer is essentially playing two games at once, one with the initially displayed first set of symbols and a second with the associated symbols.

In another embodiment of the present invention, multiple sets or decks of cards are used for central determination gaming. Central determination gaming is employed by the assignee of the present invention and is described in co-pending application Ser. Nos. 10/261,744, 10/371,722, 10/371,723, 10/371,958, 10/442,318, 10/383,423, 10/431,755, 10/601,482, 07/988,429 and 09/706,293, the teachings of which are incorporated herein by reference. In central determination, individual game terminals receive randomly generated outcomes from central or server processors. For example, in slot each symbol has a probability of being displayed on the reels after the reels have been spun. The odds of any particular symbol combination being displayed when the reels stop spinning is therefore a combination of the component symbols. In known gaming, the player's outcome is determined randomly by the combination of symbols generated.

With central determination the outcome is generated randomly at the host computer and a set of symbols yielding the outcome is displayed at the gaming terminal. Central determination provides the player with a combination of symbols that appears to generate the generated outcome. For games of pure luck, such symbol generation is facilitated readily because the player has no control. With games like poker, however, which require a degree of strategy and decision making, providing the symbols necessary to generate a previously, randomly determined outcome can become tricky.

Draw poker, in particular, can yield tricky situations for central or pre-determination. Suppose the player's outcome is generated to be four aces. The player must receive four aces. Suppose the game deals the player two aces initially. One ace is the ace of spades and the other is the ace of diamonds. Suppose also that the other three cards are spades. The player may decide to discard the ace of diamonds attempting to achieve a flush. With a single deck, four aces is now impossible. The present invention remedies the situation through the use of two decks of cards. Here, even if the player discards the ace of diamonds, the game can replenish the player's hand with three additional aces. Importantly, there needs to be enough additional cards, in relation to the total number of cards in the player's hand, to cover any contingency.

In one draw poker embodiment, all winning cards of a predetermined and centrally determined hand are dealt face-up and initially. That prevents the player from keeping losing cards, precluding the player from obtaining the winning cards from a draw. If the player discards any of the initially dealt face-up cards, the gaming device or initial processor provides another winning card in the draw to yield ultimately the predetermined win. For example, if a royal flush is randomly predetermined for and dealt initially to player, and the player foolishly discards the king for a draw card, the king of the same suit is provided to the player from the draw and from the second deck of cards. In that way, the player wins the randomly predetermined result, e.g., the royal flush regardless of the discarded winning card.

It is therefore an advantage of the present invention to provide entertaining and exciting poker games.

It another advantage of the present invention to provide entertaining and exciting blackjack games.

It is a further advantage of the present invention to provide entertaining and exciting slot games.

It is still another advantage of the present invention to provide entertaining and exciting video wagering games.

It is still a further advantage of the present invention to provide entertaining and exciting casino table games.

It is yet another advantage of the present invention to provide entertaining memorization wagering games.

It is yet a further advantage of the present invention to provide entertaining recognition wagering games.

Moreover, it is an advantage of the present invention to provide a new type of playing card.

Still further, it is an advantage of the present invention to provide a new type of slot machine symbol.

Yet further, it is an advantage of the present invention to provide multiple sets of cards that are operable with concentration poker.

Additional features and advantages of the present invention are described in, and will be apparent from, the following Detailed Description of the Invention and the figures.

BRIEF DESCRIPTION OF THE DRAWINGS

FIG. 5 is a non-inclusive variations on the games described in connection with FIGS. 4A and 4B.

FIG. 7 is a non-inclusive variations of the games described in connection with FIGS. 6A and 6B.

FIG. 9 is a non-inclusive chart of other variations of the blackjack games illustrated in FIGS. 8A and 8B.

FIG. 11 is a non-inclusive chart of variations of the game of slot of FIGS. 10A and 10B.

FIG. 14 is a non-inclusive chart of different variations of the games employing the physical association cards of the present invention.

FIG. 15 is a non-inclusive chart of different durations or periods of associations between displayed symbols and hidden symbols of the present invention.

DETAILED DESCRIPTION

The present invention includes apparatus and methods that allow a controlled degree of skill to be implemented in various gaming devices, casino table games, internet wagering games and wagering games implemented via a computer memory storage device, a database or network such as a wide area network ("WAN") or local area network ("LAN"). The present invention is implemented in a variety of wagering games, such as poker, blackjack or slot. When implemented in a gaming device, regardless of the type of game, the device has certain common features that are now described.

Figure 1A:
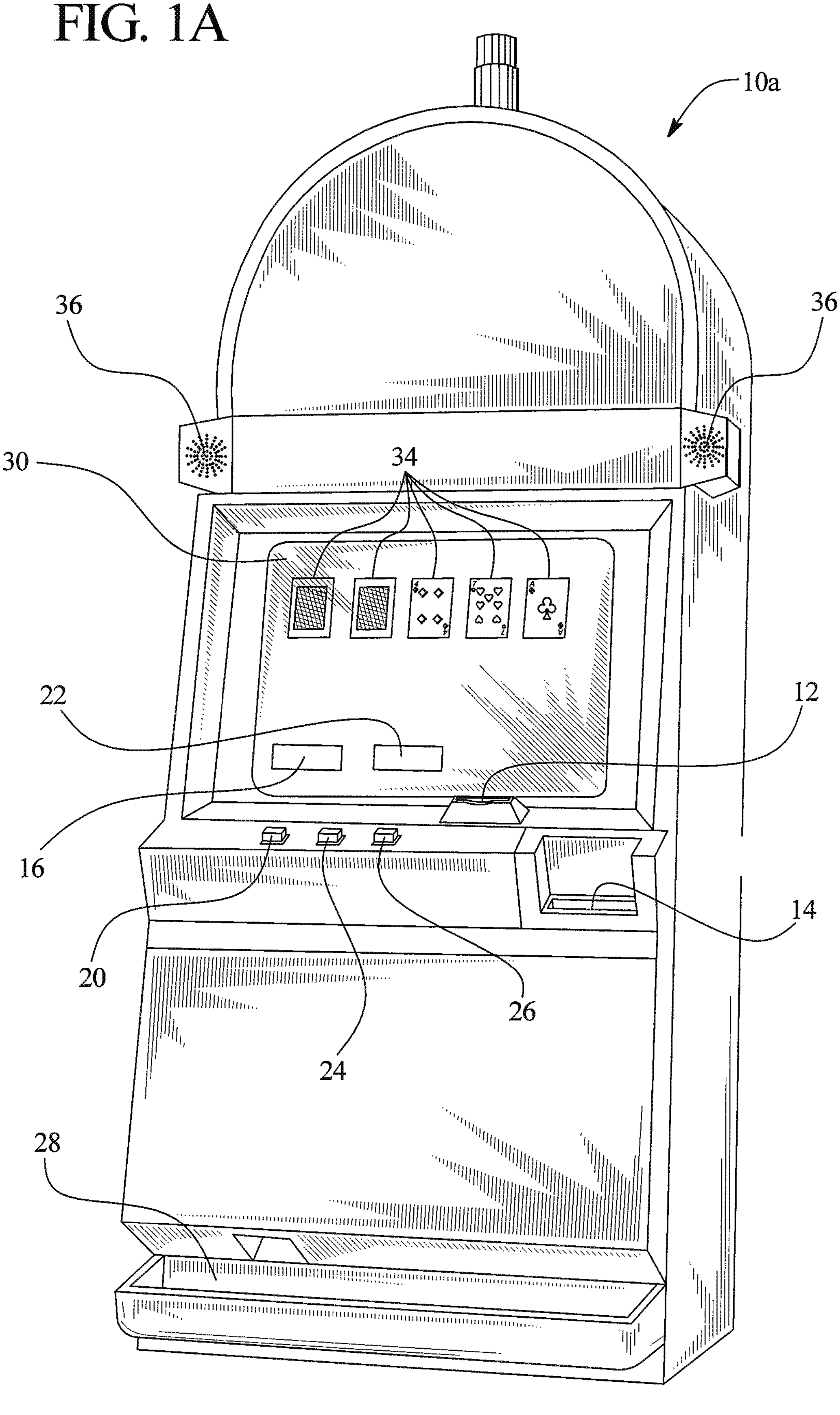
FIGS. 1A and 1B are perspective views of alternative embodiments of the gaming device of the present invention.
Figure 1B:
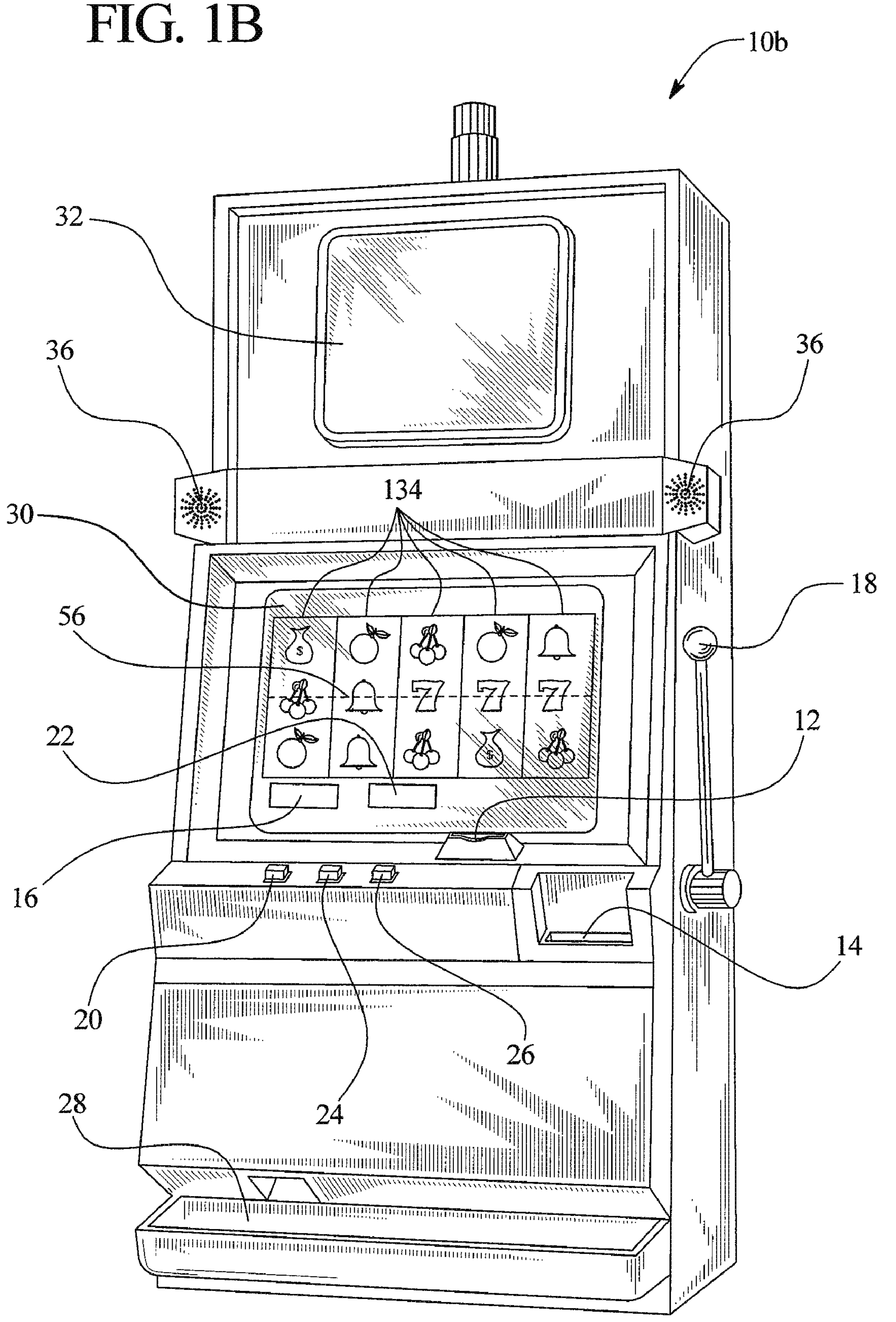

Referring now to the drawings, and in particular to FIGS. 1A and 1B, gaming device 10*a* and gaming device 10*b* illustrate two possible cabinet styles and display arrangements and are collectively referred to herein as gaming device 10. The gaming device of the present invention has the controls, displays and features of a conventional gaming machine. In various embodiments, the player operates gaming device 10 while standing or sitting. Gaming device 10 is alternatively a pub-style or table-top game (not shown), which a player preferably operates while sitting.

Gaming device 10, in certain embodiments, includes any suitable secondary or bonus triggering events, secondary bonus games as well as any progressive game coordinating with the primary or secondary games. As described below, the memorization game of the present invention may be implemented as a primary or bonus game. Gaming device 10 also includes the symbols and indicia used for any of the base, bonus and progressive games. The symbols and indicia are mechanical, electronic, electrical video-based and any combination thereof.

Gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player begins the game by pulling arm 18 (FIG. 1B) or pushing play or deal button 20. Play or deal button 20 includes any play activator (e.g., remote controller) used by the player, which starts any game or sequence of events in the gaming device.

As shown in FIGS. 1A and 1B, gaming device 10 also includes a bet display 22 and a bet one button 24. The player places a bet by pushing the bet one button 24. The player increases the bet by one credit each time the player pushes the bet one button 24. When the player pushes the bet one button 24, the number of credits shown in the credit display 16 decreases by one, and the number of credits shown in the bet display 22 increases by one. The player cashes out by pushing a cash out button 26 to receive coins or tokens in the coin payout tray 28 or other forms of payment, such as an amount printed on a ticket or credited to a credit card, debit card or smart card. Ticket printing and card reading devices (not illustrated) are known by and commercially available to those of skill in the art.

Gaming device 10 also includes one or more display devices. The embodiment shown in FIG. 1A includes a central display device 30, and the alternative embodiment shown in FIG. 1B includes a central display device 30 as well as an upper display device 32. The display devices include any suitable viewing surface, such as glass, a video monitor (e.g., liquid crystal display), a mechanical display, an electromechanical display, or any other static or dynamic display mechanism and any combination of those devices.

As illustrated in FIG. 1A, gaming device 10*a* is a video poker or blackjack machine that displays a number of cards 34. Cards 34 are dealt face up or face down as necessary. Memorization poker and memorization blackjack using cards 34 is described in detail below.

In FIG. 1B, gaming device 10*b* is a video slot machine that displays a number of reels 134. The slot machine base game of gaming device 10 displays a plurality of reels 134, such as three to five reels 134, in video form on one or more of the display devices. Each reel 134 displays a plurality of indicia, such as bells, hearts, fruits, numbers, letters, bars or other images or symbols that can correspond to a theme associated with gaming device 10. Memorization slot using reels 134 is described in detail below.

Figure 2:
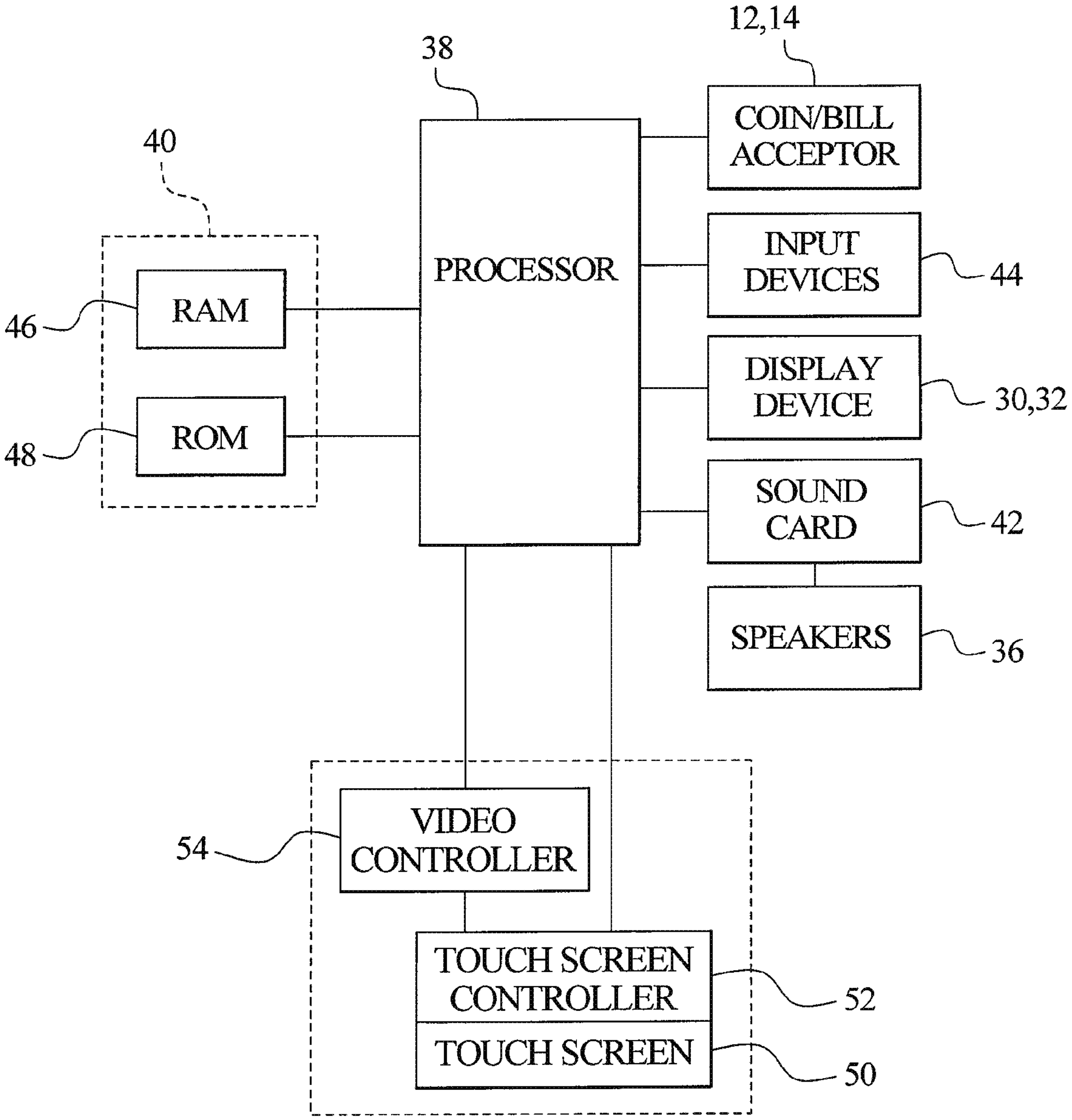
FIG. 2 is a schematic diagram of the electronic configuration of one embodiment of the gaming device of the present invention.

Referring now to FIG. 2, a general electronic configuration of gaming device 10 includes in one embodiment: a processor or central processing unit ("CPU") 38; a memory device 40 for storing program code or other data; a central display device 30; an upper display device 32; a sound card 42; a plurality of speakers 36 for making sounds and/or playing music; and one or more input devices 44. The processor 38 is a microprocessor or microcontroller-based platform in one embodiment, which is capable of displaying images, symbols and other indicia such as images of playing cards, people, characters, objects, places and things.

Memory device 40 includes random access memory ("RAM") 46 for storing event data or other data generated or used during a particular game. Memory device 40 also includes read only memory ("ROM") 48 for storing program code, which controls gaming device 10 so that it plays a particular game in accordance with applicable game rules and paytables.

As illustrated in FIG. 2, the player uses input devices 44 to input signals into gaming device 10. As illustrated in FIGS. 1A and 1B, the various embodiments of gaming device 10 share certain common input devices 44, such as a play or deal button 20, bet one button 24 and the cash out button 26. In poker, input devices 44 include specific inputs such as a draw input device or a keep/hold input device (not illustrated). In slot, for example, input devices 44 include the pull arm 18 (FIG. 1B).

As illustrated in FIG. 2, a touch screen 50 and touch screen controller 52 are connected to a video controller 54 and processor 38. In certain instances, it is preferable to use a touch screen 50 and an associated touch screen controller 52 instead of a conventional video monitor display device and electromechanical input devices 44. Touch screen 50 enables a player to input decisions into the gaming device 10 by sending a discrete signal based on the area of the touch screen 50 that the player touches or presses.

As further illustrated in FIG. 2, processor 38 connects to the coin slot 12 or payment acceptor 14. Gaming device 10 requires a player to deposit a certain amount of money to start and play the associated wagering game.

It should be appreciated that although a processor 38 and memory device 40 are one implementation of the present invention, the present invention can also be implemented via one or more application-specific integrated circuits (ASIC's), one or more hard-wired devices, or one or more mechanical devices. Furthermore, although the processor 38 and memory device 40 reside in each gaming device 10 unit, the present invention provides some or all of their functions at a central location such as a network server for communication to a playing station as over a LAN, WAN, Internet connection, microwave link, and the like. For example, in a central determination implementation of the present invention, gaming device 10 receives inputs from an external processor. Hereafter "processor" refers to any of the above-described processing alternatives.

The terms "computer" or "controller" are used herein to refer collectively to the processor 38, the memory device 40, the sound card 42, the touch screen controller 52 and the video controller 54. Memory device 40 may also be implemented remotely or via a recorded medium, such as a diskette, remote drive or tape.

Gaming device 10 also includes bonus games. Different triggering events in the primary games trigger the bonus games. In poker, the triggering event could be a particular hand or card that is dealt to the player. In slot, the triggering event can be a particular symbol or symbol combination generated on a display device or active payline 56 (FIG. 1B).

Figure 3:
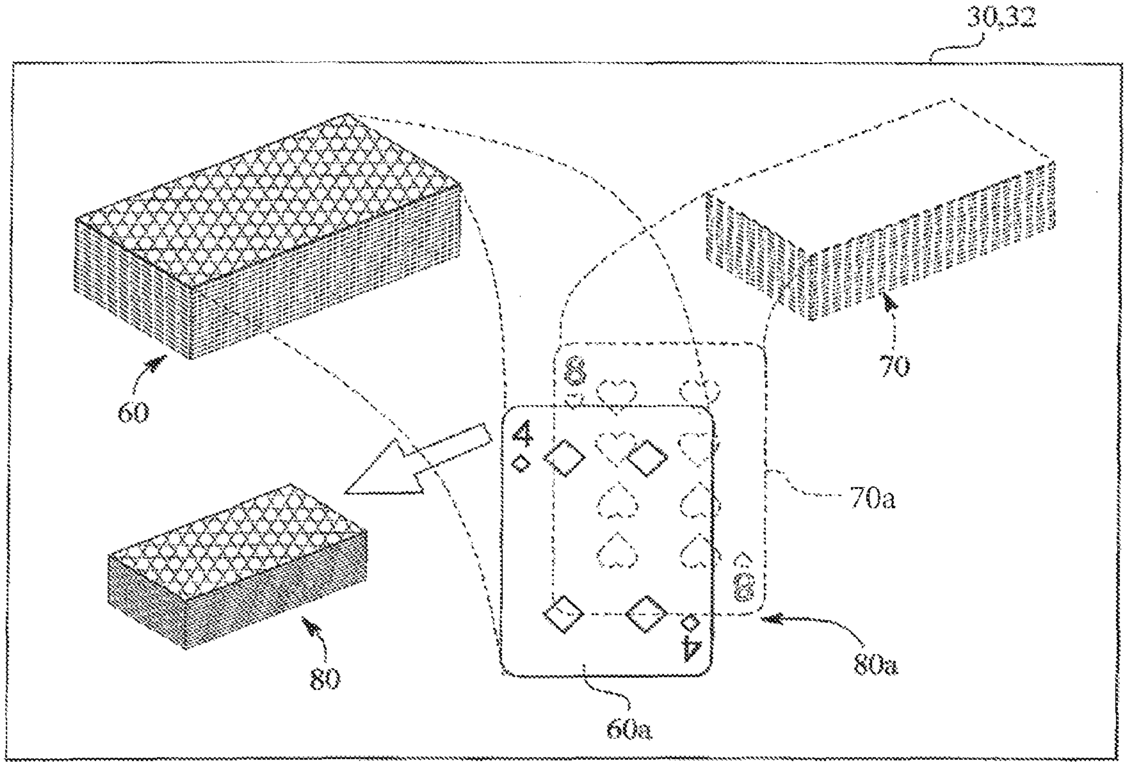
FIG. 3 is an elevation view of one of the display devices showing a simulated version of the multi-faced cards of the present invention.

Referring now to FIG. 3, one of the display devices 30 or 32 discussed above with connection with FIGS. 1A and 1B displays a virtual card set of multi-faced cards 80 (cards 80 refers collectively to cards 80*a*, 80*b*, 80*c* . . . ) of the present invention. The present invention is implemented virtually as shown in FIG. 3 or in a live casino as a table game discussed later in connection with FIGS. 12 to 14. In one embodiment, the set of multi-faced cards 80 is a deck of multi-faced cards. A deck, as that term is used herein, includes a standard deck of fifty-two playing cards and may or may not include one or more jokers.

Each multi-faced card, such as multi-faced card 80*a*, is a super-position of two cards from separate sets or decks of cards 60 and 70. Set of cards 60 is a set of displayed cards. FIG. 3 illustrates displayed card 60*a*, which is the four of diamonds. If flipped over, displayed card 60*a* would display any type of standard indicia for the face-down side of a playing card. In various embodiments herein, displayed cards 60 may be dealt face up or face down. When dealt face up, displayed card 60 displays a first value and suit combination of the multi-faced card 80 associated with the displayed card 60. For example, displayed card 60*a* includes a value of four and a suit of diamonds, which is the first value and suit associated with multi-faced card 80*a*. If dealt face down, displayed card 60*a* would display some sort of masking indicia.

A hidden card 70*a* is generated from a hidden set or deck of cards 70 and provides a second value and suit combination for multi-faced card 80*a*. Hidden card 70*a* is associated with displayed card 60*a* to create the multi-faced card 80*a*. For purposes of illustration, the hidden set of cards 70 and the hidden card 70*a*, are illustrated in phantom indicating that, in reality, display device 30 or 32 does not actually initially show hidden card 70*a* in association with displayed card 60*a* to create card 80*a*.

The present invention associates a plurality of hidden cards from hidden set 70 with a plurality of displayed cards from set 60 individually to create a set of multi-faced cards 80. The number of multi-faced cards 80 does not have to equal the number of displayed cards 60. For example, if the set of displayed cards 60 comprises a full deck of cards, some number less than fifty-two hidden cards 70 may be associated with that same number less than fifty-two of displayed cards 60 to create a set of multi-faced cards 80 having less than fifty-two cards. A card game may therefore be played where certain displayed cards 60 are associated with hidden cards 70 (i.e., as multi-faced cards 80) and where other displayed cards 60 are not associated with hidden cards 70 and thus are not multi-faced cards 80.

The multi-faced cards 80 are used to inject additional luck or varying levels of skill into games of luck, such as slot, or games of luck and strategy, such as poker and blackjack (a slot embodiment is disclosed below with multi-symbols as opposed to multi-faced cards). A game employing the multi-faced cards 80 is responsive to a player's election of an option to have a hidden card used in the game. To that end, input devices are provided or the video monitor 30 or 32 operates with a touchscreen so that the player can select to view the hidden card 70 instead of, or in addition to, the displayed card 60.

Although not illustrated, the present invention can associate a plurality of different hidden cards from different sets of hidden cards, such as set 70, with one of the displayed cards 60. That is, one or more of the displayed cards 60 is associated with a plurality of hidden cards from different sets of hidden cards. The four of diamonds displayed to the player, for example, can be associated with the eight of hearts from one set of cards and the nine of clubs from another set of cards. In such a case, gaming device 10 provides a multitude of input devices 44 or a multitude of selectable touch screen areas that allow the player to select one or more of the hidden cards 70 associated with the displayed card 60.

Figure 4A:
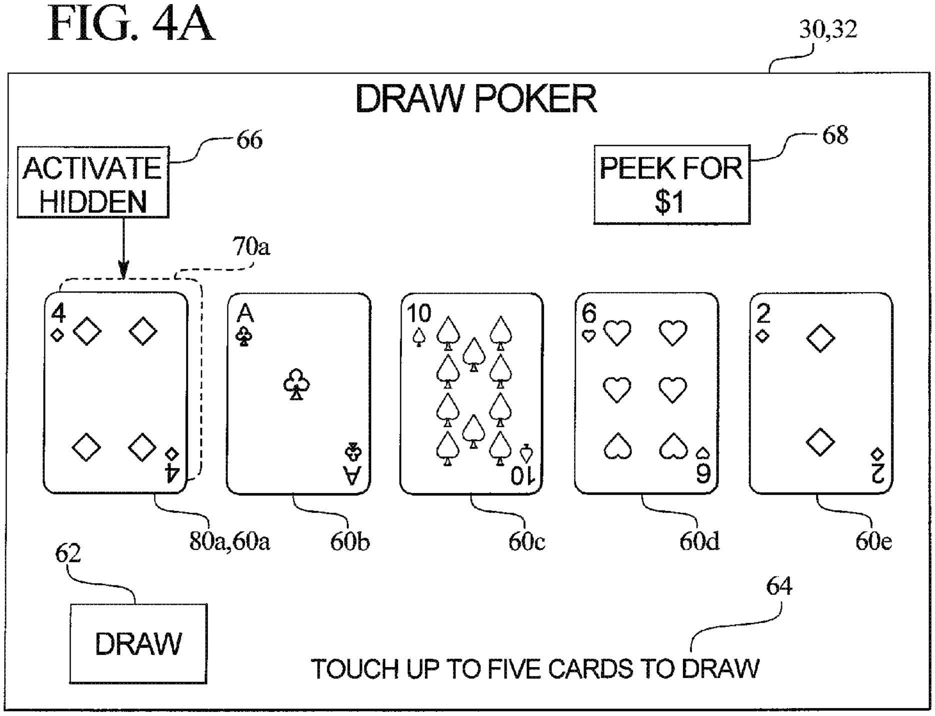
FIGS. 4A and 4B are elevations views of a display device illustrating one possible embodiment for employing the multi-faced cards in the present invention with the game of draw poker.
Figure 4B:
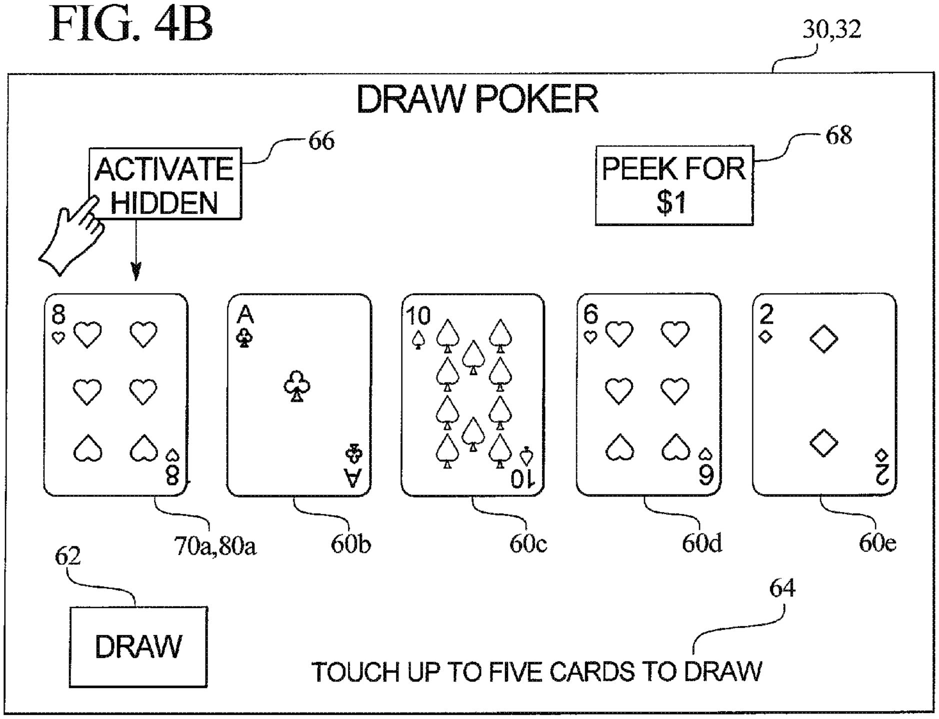

Referring now to FIGS. 4A and 4B, one of the display devices 30 or 32 illustrates a draw poker embodiment that incorporates a single multi-faced card 80*a* with a plurality of displayed cards 60*b* to 60*e*. An electromechanical or simulated draw button 62 enables the player to exchange one or more of the cards with the same number of draw cards. An audio, visual or audio-visual message 64 is provided that informs the player to touch, in the illustrated case, up to five cards to be exchanged with draw cards.

An electromechanical or simulated input device 66 allows the player to activate the hidden card 70*a*, associated with the displayed card 60*a*, in the game. As discussed in more detail below, activating the hidden card 70*a* occurs either in place of or in addition to the displayed card 60*a*.

FIG. 4A also includes an electromechanical or simulated input device 68 that allows the player, for a price, to preview the hidden card 70*a* associated with the displayed card 60*a* without committing to activating the hidden card 70*a*. The games of the present invention are structured in one embodiment so that the associations between hidden cards and displayed cards are maintained over a number of plays or hands. The player can therefore learn which hidden card is associated with which displayed card, enabling the player to employ skill in deciding to select the hidden button 66. Presumably, the player makes such selection when hidden card 70*a* will benefit the player in some manner. The peek button 68, on the other hand, enables the player to see, for a price, the hidden card 70*a* associated with displayed card 60*a* before deciding whether to commit to activating hidden card 70*a*. The player may wish to wager an additional amount, such as one credit, to see the value or suit of hidden card 70*a* rather than risk an award currently produced in part via displayed card 60*a*.

FIG. 4B illustrates that when the player selects the activate hidden button 66, the displayed card 60*a*, namely, the four of diamonds, is replaced by the initially hidden card 70*a*, namely, the eight of hearts (that association is illustrated above in FIG. 3). In an alternative embodiment discussed herein, hidden card 70*a* is displayed in addition to, rather than in place of, displayed card 60*a*.

Referring now to FIG. 5, variations of the draw poker game having a single multi-faced card 80*a* shown in FIG. 4A are discussed. In a first variation of the draw poker game of FIG. 4A, the player is enabled to exchange displayed card 60*a* with hidden card 70*a* and then either can or cannot thereafter replace card 70*a* with a draw card. In a typical video draw poker game, the player is dealt five cards face up and then allowed to change varying amounts of cards (in varying machines), up to all five cards. The multi-faced card 80*a* in FIG. 4A in the first variation of FIG. 5 is activated so that the player can replace hidden card 70*a* once activated with a draw card if desired. Alternatively, the player cannot replace hidden card 70*a* once it is activated.

Variation two can be implemented with either version of variation one and involves allowing or not allowing the player to select a draw card to replace displayed card 60*a*. That is, the player may or may not be able to obtain a new draw card instead of either keeping displayed card 60*a* or viewing hidden card 70*a*. The player may, for example, remember the value and/or suit of card 70*a*, realize that such value and/or suit is not advantageous with respect to the value and suit of card 60*a* and elect instead to exchange displayed card 60*a* with a new draw card. The player may further elect to keep displayed card 60*a* if such card is desirable.

As stated above, the hidden card 70*a* may be displayed in place of displayed card 60*a* or in addition to displayed card 60*a*. It should be appreciated that if all other variables of the draw poker game are kept constant, there would be little disincentive, if any, for the player not to select button 66 to activate hidden card 70*a* in addition to the remainder of the player's hand. When card 70*a* is displayed in addition to displayed card 60*a*, there is preferably some disincentive or risk associated with obtaining the additional card. Variation three provides one possible risk, wherein the player forfeits the ability to exchange one, or more or all of the displayed cards 60*a* to 60*e* for draw cards when the player activates hidden card 70*a* as an additional card.

Variation four indicates that different numbers of displayed cards 60 can be provided in combination with the single multi-faced card 80*a*. For example, six displayed cards 60*b* through 60*g* (not illustrated) are provided in combination with card 80*a* to play a seven card draw game. It should be appreciated that, although not illustrated, different amounts of displayed cards 60 and different amounts of multi-faced cards 80 can be provided in an stud poker game, wherein the player is not able to exchange cards for draw cards.

Variation five illustrates that one or more of the displayed cards 60*b* to 60*e* can be a wild card in accordance with the standard meaning of "wild card" as is known in the art. Alternatively, or in addition to one or more of the displayed cards 60*b* to 60*e* being wild cards, displayed card 60*a* of multi-faced card 80*a* and/or hidden card 70*a* can additionally or alternatively be wild.

In a further alternative embodiment illustrated in variation six, one or more of the draw cards is a multi-faced card 80 having a displayed card and an associated hidden card. In variation 7, the draw poker game of FIGS. 4A and 4B may or may not provide a peek option selection 68, which costs the player a certain price, such as one credit. The peek option enables the player to see the hidden card 70*a* before activating the hidden card via button 66. Selecting the activate button 66 commits the hidden card 70*a* to be part of the ultimate poker evaluation.

In a further alternative embodiment highlighted by variation eight, one or more of the cards 60*b* to 60*e* is dealt initially face down so that the player cannot see the value and suit of such one or more cards. The player can, for example, see the values and suits of cards 60*b* and 60*c* but not cards 60*d* and 60*e* initially. The player then determines whether to activate the multi-faced card 80*a* based on face-up displayed cards 60*b* and 60*c*.

A "do not activate" button (not illustrated) can also be provided so that gaming device 10 can be informed if the player decides not to activate hidden card 70*a*, or after gaming device 10 reveals the values and suits of initially face-down cards 60*d* and 60*e*. The poker valuation can be made after that reveal or the game can provide a draw sequence, wherein the player selects one or more of the cards to be exchanged with the draw card. In an alternative embodiment, the player must activate hidden card 70*a* prior to making any draw selections, so that selection of draw button 62 indicates that the player has determined whether or not to activate card 70*a*.

Figure 6A:
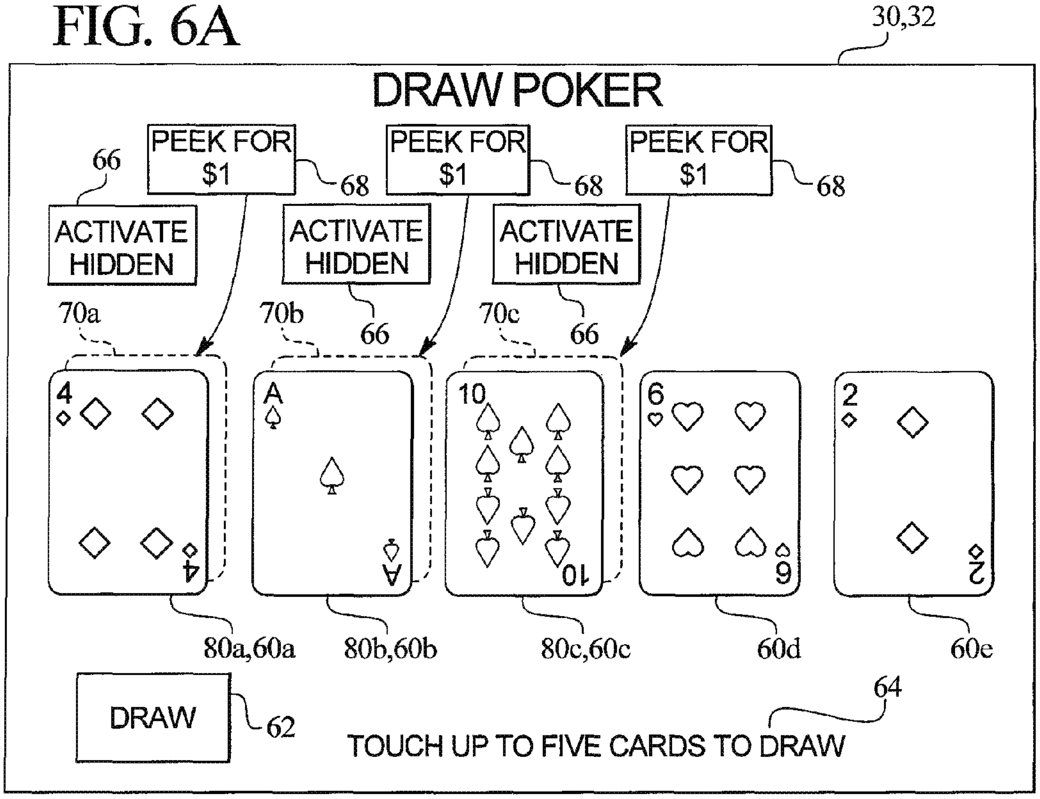
FIGS. 6A and 6B are elevation views of one of the display devices of the present invention showing another embodiment of a draw poker game employing the multi-faced cards of the present invention.
Figure 6B:
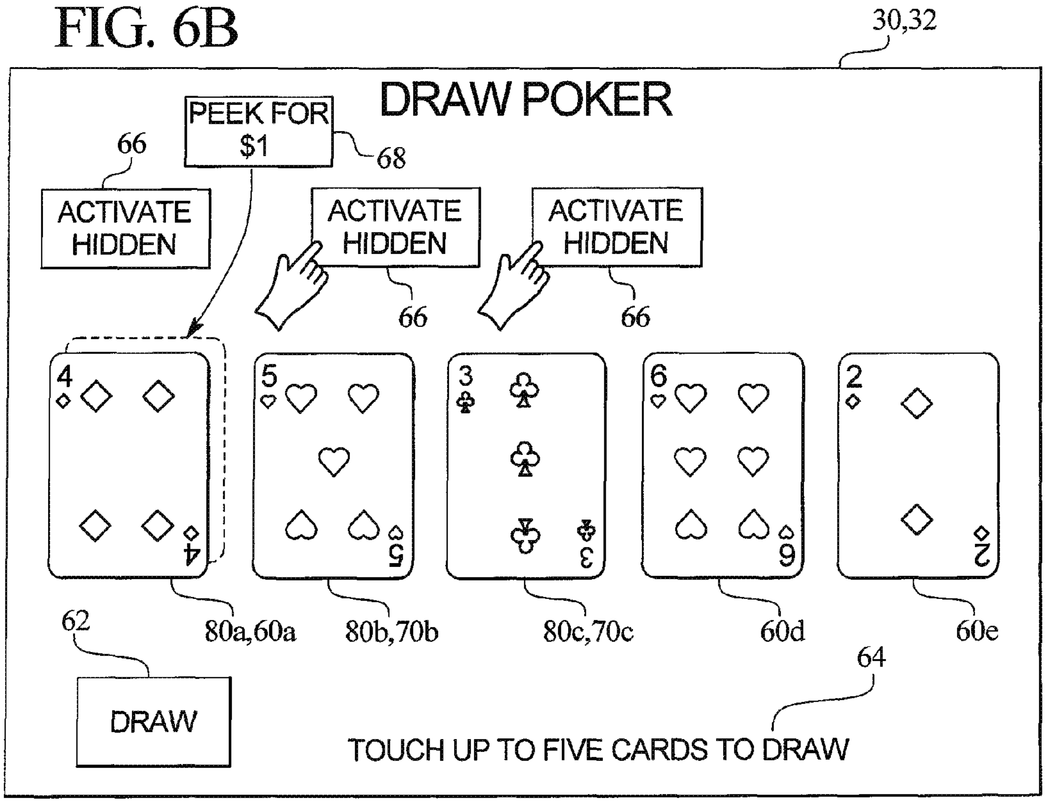

Referring now to FIGS. 6A and 6B, an alternative draw poker game is illustrated wherein a plurality of the cards or all of the cards are multi-faced cards 80. For purposes of illustration, three of the cards, namely cards 80*a*, 80*b* and 80*c* are illustrated as multi-faced cards. The remaining cards, namely, 60*d* and 60*e* are displayed cards that are not associated with hidden cards. The present invention expressly contemplates, however, associating all cards 60*a* to 60*e* with a hidden card 70*a* to 70*e*, respectively.

The display device 30 or 32 of FIGS. 6A and 6B illustrates many of the same components shown above in FIGS. 4A and 4B. The display includes a draw button 62, audio, visual, or audio-visual message 64 and a plurality of hidden card activation buttons 66. FIG. 6A also shows a plurality of peek buttons 68. In the illustrated embodiment, each of the multi-faced cards 80 is associated with a separate activate and peek button. In an alternative embodiment, one or both of those buttons is provided only once on display device 30 or 32. In such a case, the player presses the desired button and then the desired card or vice versa. For example, to activate multi-faced card 80*a*, the player would select the activate hidden button 66 and then select multi-faced card 80*a*.

FIG. 6B illustrates that the player has selected to activate multi-faced cards 80*b* and 80*c*. Accordingly, multi-faced card 80*a* still displays the initially displayed card 60*a*, while the multi-faced cards 80*b* and 80*c* display the hidden cards 70*b* and 70*c*, respectively. The displayed card 60*b*, namely, the ace of spades (FIG. 6A), has been replaced with hidden card 70*b*, namely, the five of hearts (FIG. 6B). The displayed card 60*c*, namely the ten of spades, has been replaced by the hidden card 70*c*, namely, the three of clubs. The display of the hidden cards 70*b* and 70*c* has created a winning combination known as a straight, which is the accumulation of five consecutive numbers of values, here the values two through six.

FIG. 6B has removed the peek buttons 60*a* for multi-faced cards 80*b* and 80*c* since this function is no longer applicable to the hidden cards 70*b* and 70*c*, which are now displayed. Peek button 60*a* still exists for multi-faced card 80*a*. Gaming device 10 in one embodiment enables the player to activate one or more of the multi-faced cards and then exercise the peek option for one or more of the displayed cards. It should therefore be appreciated that at the stage of the game in FIG. 6B, the player is still able to activate multi-faced card 80*a* if the player so desires. Otherwise, in draw poker, the player can select one or more cards to exchange for draw cards in accordance with the embodiments described below in connection with FIG. 7. Further, although not illustrated, a keep button can be provided so that the player can keep the straight winning combination illustrated in FIG. 6B without drawing or exchanging a single one of the cards of the straight.

FIG. 7 illustrates certain of the variations that are possible with the draw poker game of FIGS. 6A and 6B. It should be appreciated that the lists associated with FIGS. 5 and 7 are non-inclusive and are not in any way intended to limit the scope of the claims of the present invention. Variation one of FIG. 7 illustrates that, in different embodiments, gaming device 10 can limit the player to selecting only one or a percentage of the available multi-faced cards. For example, if the player activated multi-faced card 80*b*, the player could be precluded from activating either of multi-faced cards 80*a* or 80*b*. In that way, the player has to pick and choose which of the hidden cards 70, if any, should be activated. The present invention includes, on the other hand, enabling the player to activate all of the provided multi-faced cards 80.

Variation two in connection with FIG. 7 illustrates that in different embodiments, the player can or cannot replace an activated hidden card with a draw card. The present invention also includes limiting the player to replacing with draw cards only one or a percentage of the hidden cards that have been activated. In a further alternative embodiment, gaming device 10 enables the player to replace all activated hidden cards with draw cards.

In variation four of FIG. 7, gaming device 10 in one embodiment does not allow the player to replace displayed cards 60*d* and 60*e* with a draw card if the player activates one or more of the hidden cards. In an alternative embodiment, gaming device 10 limits the player to replacing less than all of the displayed cards 60*d* and 60*e* with a draw card if the player activates one or more of the hidden cards. Further alternatively, gaming device 10 enables the player to replace each of the displayed cards 60*d* and 60*e* in the event that the player activates one or more of the hidden cards 70*a* to 70*c*.

In variation five of FIG. 7, any suitable combination of multi-faced cards 80 and displayed cards 60 can be provided. For example, cards 80 and 60 totaling seven in any combination can be provided for the game of seven-card-draw poker. In variation six, one or more of the values of the displayed cards 60 or hidden cards 70 is a value designating the card as a wild card as is known in connection with poker.

In variation seven, one or more of the cards 60*d* or 60*e* is dealt face down. In variation eight, one or more of the draw cards can or cannot be a multi-faced card 80. Variation nine illustrates that the buy a peek function is operable with one of, a percentage or plurality of or all of the multi-faced cards 80.

In any of the embodiments described herein, gaming device 10 can provide hints to the player that guide or tend to guide the player towards optional game play. The hints can vary in helpfulness from being vaguely helpful, e.g., "haven't you seen that card before" to being extremely explicit, e.g., "the four of diamonds you see is associated with the eight of hearts." In certain embodiments, gaming device is programmed to generate hints randomly or after a number of unsuccessful and/or non-optional plays by the player. Further, gaming device 10 can preset or generate randomly the level of helpfulness of the hints, e.g., three vague hints followed by an explicit hint or an implicit hint weighted to occur randomly one-third of the time.

Figure 8A:
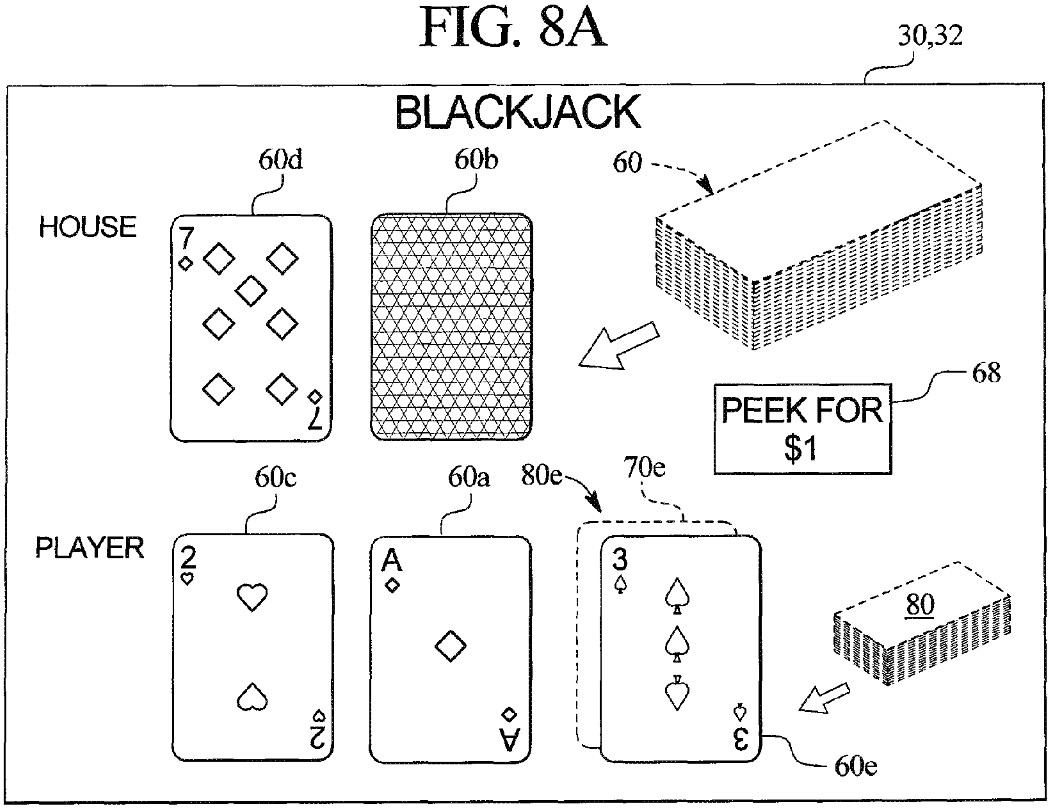
FIGS. 8A and 8B are elevation views of one of the display devices of the present invention showing various embodiments of a blackjack game employing the multi-faced cards of the present invention.
Figure 8B:
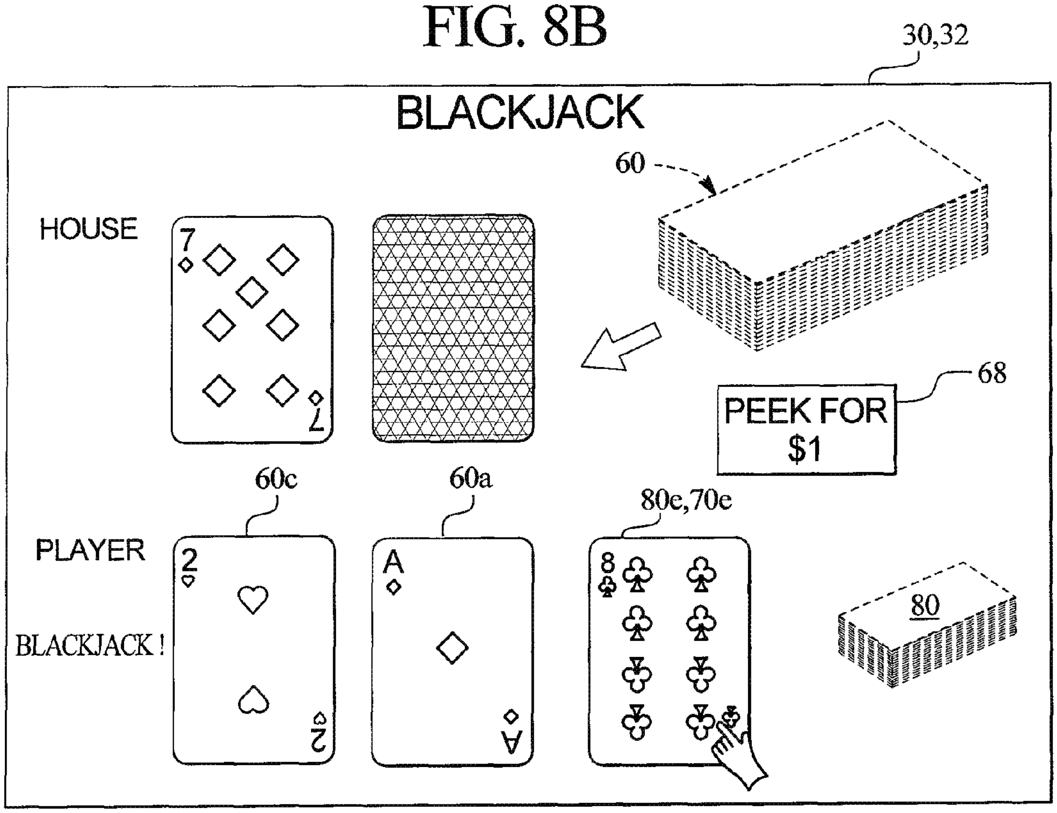

As discussed above, the multi-faced cards of the present invention are operable with a multitude of different card games. FIGS. 8A to 9 illustrate the application of multi-faced cards 80 to the game of blackjack. FIGS. 8A and 8B illustrate the display device 30, 32 having a blackjack game, wherein a hand that is dealt to the house and to the player. The standard deck of cards is used to supply the displayed cards 60. As in known blackjack, the dealer deals card 60*a* to the player face up and card 60*b* to the dealer face down. The dealer then deals card 60*c* to the player face up and then the card 60*d* to the dealer face up. The player then decides whether to take one or more card "hits" or stick with the cards 60*a* and 60*c*. In FIG.

8A, the player decides that the player's total of three or thirteen will not likely defeat the house, so the player decides to take a hit, wherein gaming device 10 generates multi-faced card 80*e*, which includes displayed card 60*e*, namely, the three of spades.

In FIG. 8B, the player activates multi-faced card 80*e*, in this case by selecting the displayed card 60*e*, which results in the replacement of the displayed card 60*e* with the hidden card 70*e*. In alternative embodiments discussed below, the hidden card 70*e* is displayed in addition to the display of card 60*e*. Also discussed below, the association between displayed card 60*e* and hidden card 70*e* can be such that the player can learn and memorize the fact that the three of spaces as shown in FIG. 8A is associated with the eight of clubs shown in FIG. 8B. The player, therefore, gladly selects the displayed card 60*e* in FIG. 8A to achieve the blackjack in FIG. 8B.

Referring now to FIG. 9, a non-inclusive list of variations for blackjack is shown. Again, the list of FIG. 9 is in no way intended to limit the scope of the present invention but instead illustrates that the multi-faced cards of the present invention lend themselves to be applied to many different games in many different ways. Variation one illustrates that the value of hidden card 70*e* is added to the player's blackjack total, either in place of or in addition to the value of the displayed card 60*e*. In the above example, if the value of eight is added to the player's total along with the value of displayed card 60*e*, the player achieves the total of fourteen. Fourteen is the sum of the two of hearts, the ace of diamonds which has to be counted as one to avoid a bust, the three of spades of displayed card 60*e*, and the eight of clubs of hidden card 70*e*.

Variation 2 of FIG. 9 illustrates alternative embodiments wherein hidden card 70*e* can or cannot be activated to reverse a bust caused by displayed card 60*e*. In one preferred embodiment, the multi-faced card 80*e* cannot be activated to reverse a bust because to allow such would render the decision of whether or not to activate hidden card 70*e* of multi-faced card 80*e* moot. That is, the player who has busted has nothing to lose by activating the associated hidden card in an attempt to reverse the bust.

Variation 3 illustrates that in one embodiment, the activation of hidden card 70*e* results in an automatic stick. That is, the player can no longer accept a hit from either the deck of displayed cards 60 or multi-faced cards 80. The embodiment operates similar to a "double-down", which is a blackjack option enabling a player after obtaining two cards to double the player's bet. With blackjack double-downs, the player receives one additional card only.

Variation 4 of the game of blackjack illustrates that one or both the initially dealt cards 60*a* and 60*c* is alternatively a multi-faced card 80*a* or 80*c* that is associated respectively with hidden cards 70*a* and 70*c*. The one or more initially dealt multi-faced cards is provided alternatively or in addition to multi-faced card 80*e*. That is, the initially dealt cards 60*a* and 60*c* can be associated with hidden cards and one or more of the player's hit cards can alternatively be simply a displayed card that is not associated with a hidden card. Further alternatively, any one or more hit cards can be associated with a hidden card. The determination of whether to associate a hidden card with the player's hit cards can be random or be determined according to a predefined pattern. Further, the decision of whether to associate a hidden card with one of the initially displayed cards 60*a* and 60*c* is also determined in alternative embodiments either randomly or according to a predefined pattern.

Variation 5 of FIG. 9 illustrates that the dealer alternatively obtains one, or more, or all multi-faced cards 80. That is, either displayed card 60*b* or 60*d* or both is associated with a hidden card 70*b* and 70*d*, respectively. Further, any of the dealer's hit cards is also alternatively a multi-faced card 80.

Variation 6 of FIG. 9 illustrates that gaming device 10 alternatively enables or does not enable the player to split a pair of multi-faced cards 80. Variation 7 illustrates that if the player receives a multi-faced card on a double-down (described above), the hidden card is auto-activated to replace or add to the player's total in alternative embodiments. Further alternatively, gaming device 10 enables the player on a double-down to choose to replace with or add hidden card 70 upon receiving the multi-faced card 80. Still further alternatively, gaming device 10 does not enable the player to choose to either add or replace the hidden card 70 on a double-down.

Variation 8 of FIG. 9 illustrates that the peek for a price button 68 is implemented in one embodiment with the game of blackjack. The price of the peek is adjusted accordingly with the advantage given to the player via such option.

Figure 10A:
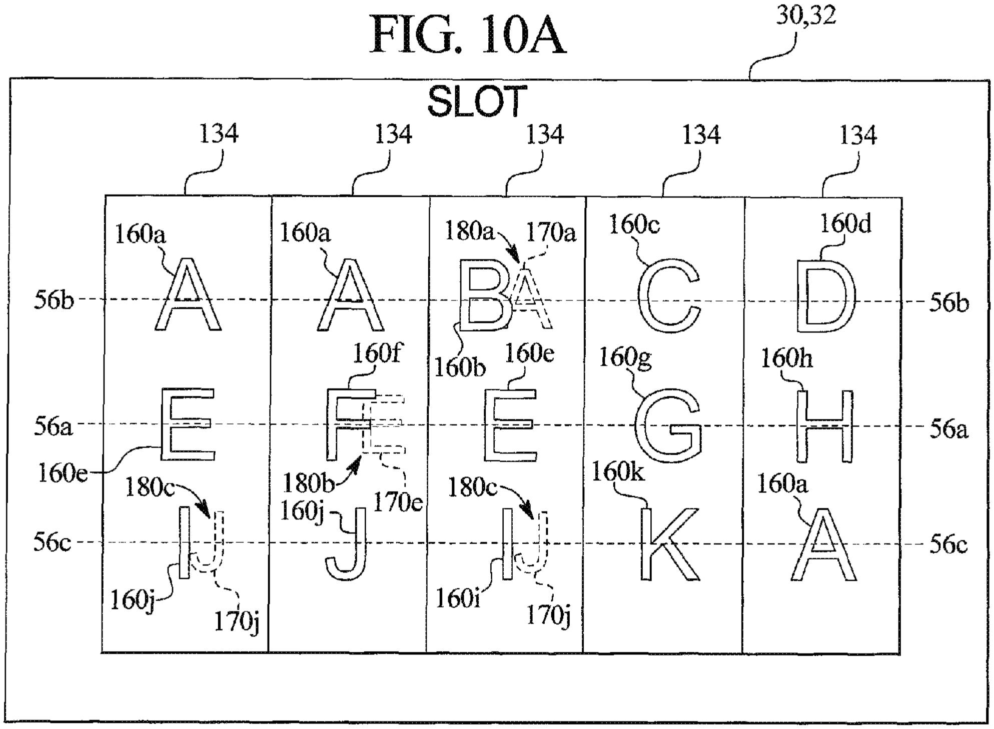
FIGS. 10A and 10B are elevation views of one of the display devices of the present invention showing the game of slot in combination with the multi-symbols of the present invention.
Figure 10B:
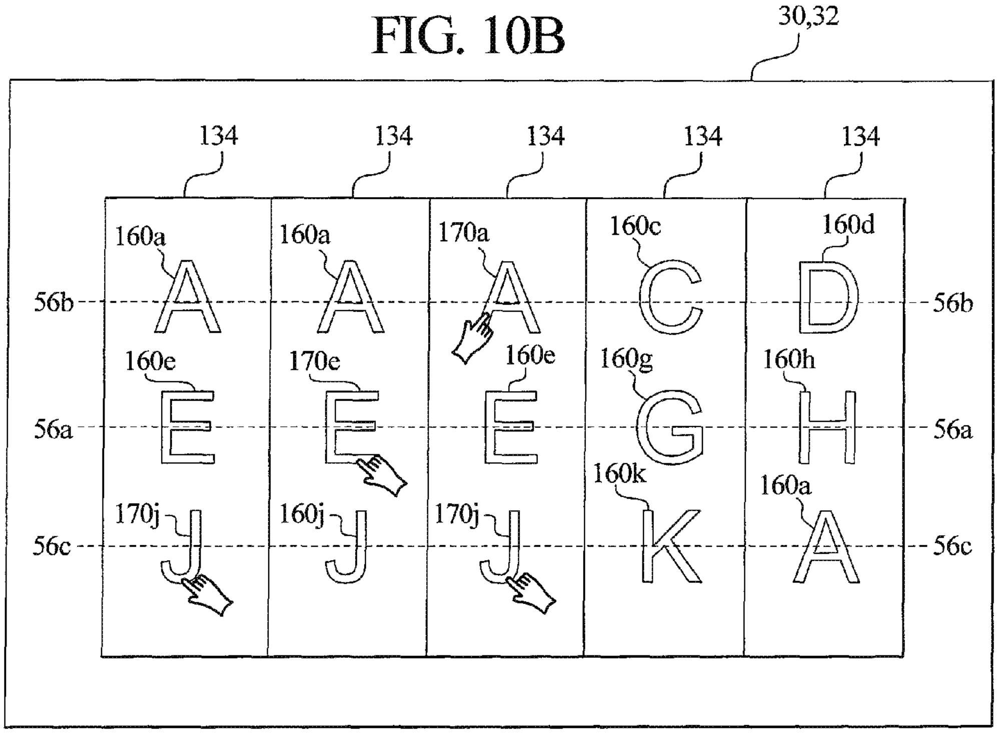

Referring now to FIGS. 10A and 10B, multi-symbols 180 are illustrated in connection with the game of slots. The slot embodiment is provided on a video monitor 30 or 32, wherein the multi-symbol 180*a* is activated through the use of a touch-screen. In an alternative embodiment, hidden symbols 170 associated with the displayed symbols of the multi-symbols 180 (collectively referring to multi-symbol 180*a*, 180*b*, etc.) are activated via electromechanical inputs 44.

FIG. 10A illustrates a slot machine having five reels 134 as is also illustrated in FIG. 1B. The multi-symbols 180 may be provided in a slot game having any suitable number of reels, any suitable number of paylines, wherein the reels and paylines are situated in any suitable desirable manner. For simplicity, the slot game of FIGS. 10A and 10B is shown having three horizontal paylines 56*a* to 56*c*. The slot screen illustrated in FIGS. 10A and 10B shows a random generation of symbols that has just taken place, yielding the "a," "a," "b," "c," and "d" combination along payline 56*b*; the "e," "f," "e," "g," and "h" combination along payline 56*a*; and the "i," "j," "i," "k," and "a" combination along payline 56*c* in FIG. 10A.

In the illustrated embodiment, symbols 160*a*, 160*c*, 160*d*, 160*e*, 160*g*, 160*h*, 160*j*, and 160*k* are each normal symbols that are displayed and are not associated with hidden symbols. Displayed symbols 160*b*, 160*f*, and 160*i* are, on the other hand, associated with symbols 170*a*, 170*e* and 170*j*, respectively, to form multi-symbols 180*a*, 180*b*, and 180*c*, respectively. FIG. 10B illustrates the outcome of the player's selection of the multi-symbols 180*a*, 180*b* and 180*c*.

In FIG. 10B, the player has activated each of the multi-symbols 180*a*, 180*b* and 180*c*. Such activation has led to the display of the hidden symbol 170*a* on payline 56*b*, the hidden symbol 170*e* on payline 56*a* and the hidden symbol 170*j* on payline 56*c*. Each of the activations illustrates a subtle difference in the operation of the associated symbols of the present invention in combination with slot.

Payline 56*b* illustrates that if, for example, the previously generated "a, a" combination is already a winning combination, the activation of a hidden symbol, in this case hidden symbol 170*a*, can add to a previously achieved win. The activation of the hidden symbol 170*e* along payline 56*a* illustrates that a winning combination, namely the "e, e, e," combination, can be created, where no winning combination existed before. That is, in FIG. 10A the symbol combination "e, f, e" along payline 56*a* does not result in an award for the player.

The activation of hidden symbols 170*j* along payline 56*c* illustrates that gaming device 10 in one embodiment enables the player to activate multiple symbols along the same payline, even if two or more symbols bear the same indicia. Alternative embodiments to that option are discussed below.

Referring now to FIG. 11, a non-inclusive list of variations on the game of slot employing the multi-symbols of the present invention is illustrated. As before, this list is in no way intended to limit the scope and breadth of the present invention and instead illustrates that the multi-symbols of the present invention are applicable in a wide variety of different gaming alternatives. It should also be appreciated that for purposes of claiming the present invention, the term "multi-symbol" includes the above-described term multi-faced card. That is, the term multi-symbol includes displayed and hidden symbols on a slot machine and also displayed and hidden symbols or variables (e.g., value and suit) on the face of playing cards.

Variation 1 of FIG. 11 illustrates an alternative embodiment, wherein the player is enabled to activate a hidden symbol 170 only on an active payline. Slot machines offering multiple paylines often allow the player to select one, or more or all of the paylines. Therefore as an incentive for the player to activate more paylines, gaming device 10 in an embodiment only enables the multi-symbol feature to be activated on an active payline.

Variation 2 of FIG. 11 illustrates that in a bonus embodiment of the present invention, the activation of a hidden symbol 170 on a previously inactive payline activates the aforementioned inactive payline. Bonus games are popular particularly in association with the game of slot. The likelihood of obtaining a multi-symbol anywhere on display device 30 or 32 can be set to be remote or relatively frequent according to game mathematics. The achievement of the multi-symbol is provided to the player as a bonus in addition to any wins provided as a result of the standard play of slots. The multi-symbol provided in a bonus embodiment is implemented in one embodiment so that if the multi-symbol appears on an inactive payline, gaming device 10 grants a bonus to the player and activates such payline and provides any award associated on that payline due to activation of the associated hidden symbol.

Variation 3 of FIG. 11 illustrates that the player may or may not be allowed to activate multiple symbols on any given payline. As shown above in connection with FIGS. 10A and 10B, the player activates two multi-symbols along payline 56*c* in order to obtain an award. Alternatively, gaming device 10 forces the player to choose between two or more of the same or different multi-symbols 180. In a further embodiment, gaming device 10 enables the player to activate less than all multi-symbols on a per screen basis rather than a per payline basis.

Variation 4 of FIG. 11 illustrates that a win for the player that is increased due to the activation of the hidden symbol 170 is paid alternatively in different ways. In one embodiment, the player receives the award due to the increased win in place of the award due to the initially generated winning symbols. In another embodiment, the award due to the increased win is paid in addition to the award paid due to the win associated with the initially generated winning combination.

Discussed below and in connection with FIG. 15 are various embodiments for the durations with which any particular hidden symbol is associated with any particular displayed symbol. In one embodiment, the duration is a long term or even a fixed duration. In such a case, each time the displayed symbol 160 of the multi-symbol 180 is displayed, the hidden symbol upon activation is the same. In such a case, gaming device 10 in one embodiment displays the fixed associations in the paytable of the slot machine. Older slot machines tend to place the paytable on the upper glass located above the reels. Newer slot machines having a larger amount of winning combinations of symbols often provide a screen that the player selectively accesses to view the possible winning combinations for the slot machine. In either case, gaming device 10 of the present invention can post the displayed hidden symbol associations.

Figure 12:
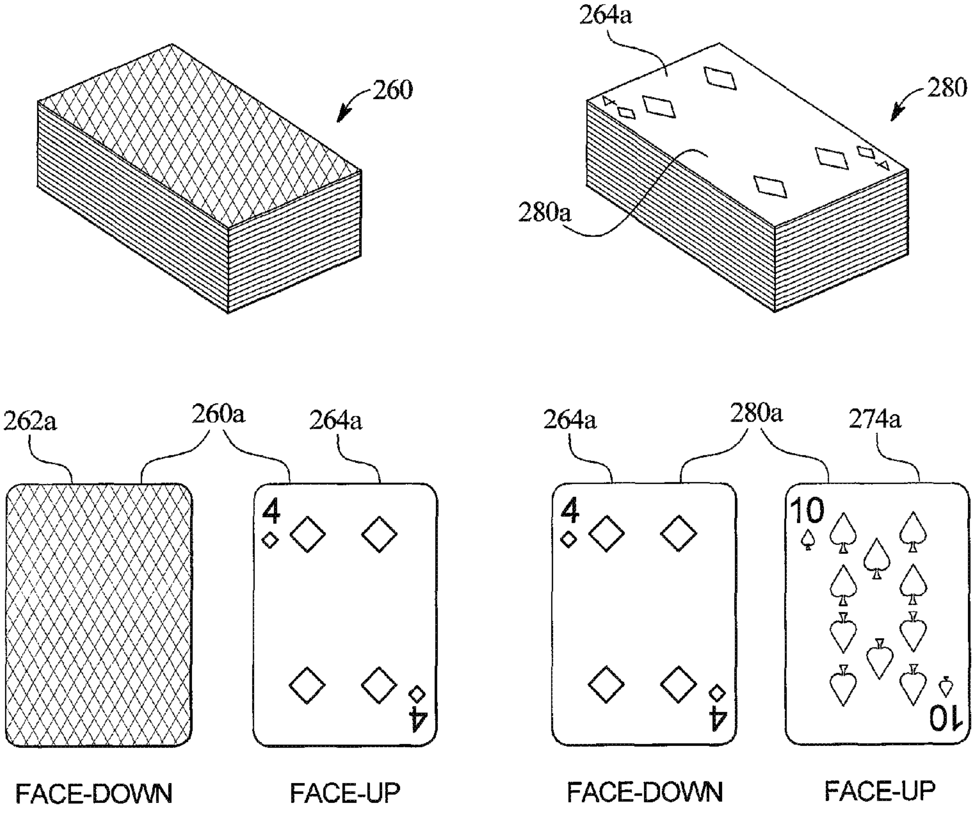
FIG. 12 illustrates perspective and elevation views of a set of physical playing cards and a physical association deck of playing cards of the present invention.

As discussed above in the Summary of the Invention section, the present invention can be implemented in virtual gaming on a video monitor or in live gaming at the casino. FIGS. 1 to 11 have each discussed numerous games employing the multi-symbols of the present invention in connection with a video monitor. FIGS. 12 and 14 illustrate various embodiments for providing the multi-symbols or the multi-faced cards in a real table game. It should therefore be appreciated that any of the above-described embodiments involving virtual or simulated cards is alternatively performed using the physical cards discussed in connection with FIGS. 12 to 14. FIG. 12 illustrates a physical set or deck of cards 260. One of the cards 260 from the set or deck, namely 260*a*, is also shown. The cards 260 each include a face-down side 262*a* and a face-up side 264*a*. Face-down side 262*a* includes any indicia associated with known playing cards for coloring or marking the face-down side of a playing card. Face-up side 264*a* shows a value and suit, here the four of diamonds.

FIG. 12 also illustrates a set of physical association cards 280. One of the association cards 280, namely card 280*a*, is also displayed. One side of association card 280*a*, namely the face-down side 264*a*, includes the same indicia as the face-up side 264*a* of the displayed card 260*a*. The face-down side 264*a* of the association card 280*a* (i.e., the side that is initially visible to the player) is therefore labeled the same as the face-up side 264*a* of the playing card 260*a*. The sides 264*a* thus form the association between playing card 260*a* and association card 280*a*.

The face-up side 274*a* of association card 280*a* (i.e., the side of the card that the player must activate to see) includes the hidden or initially not displayed value and suit. In this illustration, the ten of spades is associated via association card 280*a* with the four of diamonds of the playing card 260*a*.

In one embodiment, the set of playing cards 260 is a standard set of fifty-two playing cards. The set of association cards 280 can include an association card 280 for each playing card 260 or an association card 280 for one or more but less than all of the playing cards 260.

Figure 13:
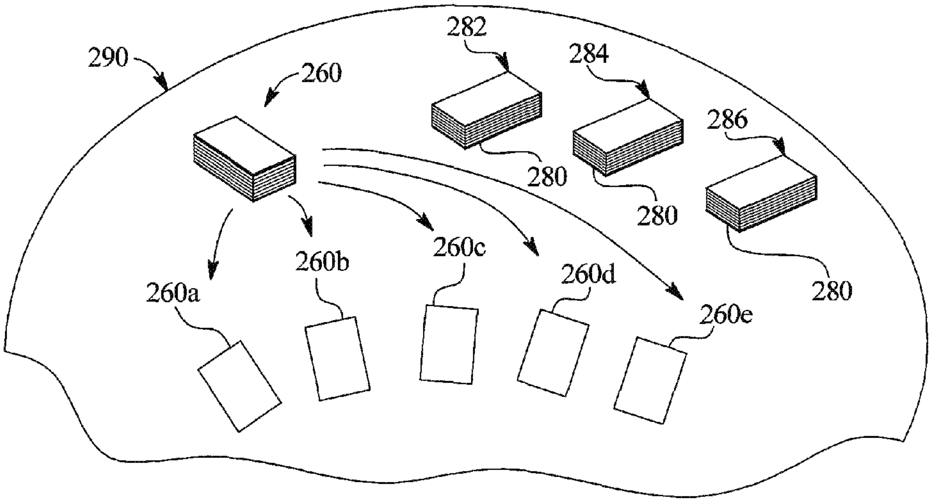
FIG. 13 is a perspective view of a portion of a gaming table employing the physical association cards of FIG. 12.

Referring now to FIG. 13, a gaming table 290 is illustrated. Gaming table 290 can be for any type of playing card game including poker and black jack including any of the variations of those games discussed herein. Various poker embodiments are illustrated in connection with FIG. 14. FIG. 13 and FIG. 15 illustrate that different associations can be made at different times with different decks of playing cards 260. Table 290 includes the set of playing cards 260 from which individual cards 260*a* to 260*e* are dealt. Each of those cards is associated with one of the association cards 280 in each of the sets or decks 282, 284 and 286. That is, playing card 260*a* for example is associated with a first association card 280*a* in set 282, a second association card 280*a* in set 284 and a third association card 280*a* in set 286. The first, second and third associations can be the same or different as desired. Further, card 260*a* may have an associated card in set 282 but not in set 284. In this manner, the playing card game changes depending on which set 282, 284 and 286 of association cards 280 is used by the dealer.

It should also be appreciated that the set of playing cards 260 is not necessarily a deck of playing cards and therefore that different sets of playing cards 260 may also be used in various different playing card games. Further, if set 260 is a standard deck of cards, it is also contemplated to use multiple decks of standard cards 260*a* at once as is commonly done in blackjack and other playing card games. In that case, there would be a multitude of playing cards 260*a* (e.g., multiple cards having a face-up side 264*a* of the four of diamonds) for example. Each of those multitude of playing cards 260*a* would be associated with an association card 280 from any of the sets 282, 284 and 286 of association cards.

In operation, the dealer can physically spread apart the sets of association cards 280 so that the appropriate card can be located easily and given to the player upon activation either as a replacement for or addition to the player's cards dealt from set 260.

Referring now to FIG. 14, a non-inclusive list of different poker games that may be played using the association cards 280 of FIGS. 12 and 13 is illustrated. Again, the list of FIG. 14 is in no way intended to limit the scope of the invention but rather shows how the association cards 280 of the present invention may be utilized in many different games and in many different ways in such games. Variation 1 of FIG. 14 reiterates the fact that the association cards 280 may be used in live table gaming with any of the draw or stud poker embodiments discussed above in connection with FIGS. 3 to 7.

Variation 2 illustrates that the association cards 280 may be used in connection with a stud poker game. One very popular stud poker game in casinos is the game of Caribbean stud poker. In Caribbean stud poker, the player and dealer are each dealt a separate set of cards after the player makes an initial bet. The dealer then turns one of the dealer's cards face up. The player then decides whether to place an additional call bet or surrender, losing the player's initial bet. If the player makes the call bet, the dealer reveals the rest of the dealer's cards. If the dealer does not qualify, i.e., obtain an ace, king or better, the player's call bet is returned. If the dealer does qualify, the player's cards are then pitted against the dealer's cards in standard poker fashion.

The association cards 280 may be combined with the game of Caribbean stud poker in a variety of ways. First, the player can activate the hidden or face-up side 274 of an association card 280, which is associated with the face-up side of the player's initially dealt card, before or after placing the call bet. Alternatively or in addition to the aforesaid, the player can activate the face up or hidden side 274 of the association card 280 after the dealer shows the dealer's hand. The Caribbean stud poker embodiment also includes charging the player a fee in order to activate the hidden side 274 of an associated card.

Variation 3 of FIG. 14 illustrates the popular game of Let It Ride™ poker in combination with the associated cards 280 of the present invention. In a typical game of Let It Ride™ poker, the player needs to obtain at least a pair of tens to win. The player is dealt three cards and makes a separate wager in association with each of the three dealt cards. The dealer places two community cards in the center of the table face down. After the player sees the player's three cards, the player decides whether to withdraw a first bet one of the three or let it ride on the table. The dealer reveals a first one of the community cards. Next, the player decides whether to withdraw a second one of the three bets. The dealer than reveals a final card and the hand is scored according to the rules of poker.

Let It Ride™ poker is combined with the associated cards 280 in a variety of ways. The game can be structured so that the player activates the face-up or hidden card 274 anytime before one or both of the community cards is revealed or after the second community card is revealed. In an alternative embodiment, one or both of the community cards can also or alternatively be a multifunction card that is associated with an associated card 280.

Referring now to FIG. 15, any of the embodiments disclosed herein may be played in a game where the association between hidden cards or symbols is maintained for different periods of time. Each of the variations discussed herein is applicable to the simulated multi-faced cards, the physical multi-faced cards and the simulated symbols. For purposes of describing the different periods of association, the term multi-symbol and hidden symbol are used to describe each of the embodiments disclosed herein.

In variation one of FIG. 15, the symbol associations last for a single play. That association leads to a random game because the player has no ability to know or memorize the association between any hidden symbols and any displayed symbols. The player therefore guesses whether to activate the hidden symbol. As discussed above, there may be times when it is prudent to activate the symbol, such as in blackjack in order to obtain a more favorable blackjack total. The single play association is also applicable to slot and any of the poker embodiments described herein.

In variation two, the same associations are maintained for multiple plays, such as multiple hands of poker, multiple blackjack hands or multiple spins of a slot machine reel. For example, the casino or gaming device can maintain the same associations for ten hands of poker. That creates an interesting dynamic because it may be in the player's best interest to view as many hidden cards as possible early on in the ten hands so as to attempt to gain as much knowledge as possible and as quickly as possible about the associations. Maintaining the same associations for multiple plays enables the player to begin to learn, remember and perhaps record the associations between the displayed symbols and the hidden symbols.

A third variation is similar to the second variation, however, the associations last until a certain game event occurs. In one embodiment, the associations last until the player cashes out or runs out of credits. If the player runs out of credits, gaming device 10 in one embodiment maintains the associations for a period of time such as one minute, to enable the player to insert additional coins or tokens and play the memorization game using the same associations. Display device 30, 32 can display a suitable message that informs the player of the time period and that the associations are temporarily maintained. In a further embodiment, gaming device 10 maintains the associations as long as the player has a player tracking card inserted in gaming device 10. The maintenance of the associations serves to promote further gaming. The associations may also be maintained for other reasons in accordance with the present invention.

In still another embodiment of the third variation of the embodiment, the event may be a gaming event such as a large progressive pay out, a bonus pay out or the generation of a particular combination of symbols. For example, the associations may last in poker until a full house is dealt to either the player or the house. The duration of variation three also presents an interesting dynamic to the player because the game presumably becomes more favorable to the player the longer the player plays. This fact may encourage players to continue wagering, which is typically desirable by a gaming establishment.

Variation four of FIG. 15 is a long term association in which the associations are fixed at least for the foreseeable future. The long term fixed associations can be made for example, as long as that particular game is installed in a gaming terminal, as long as a particular version of software is installed in gaming device memory 40 or for a period of one year at a gaming table at a casino. Games employing fixed long term associations are structured under the assumption that the player has knowledge of the associations before the player begins play. The player may have a crib sheet or other type of recording device that lists the associations. Even still, the player must use skill to either remember an association or apply it correctly. Thus the fixed long term game adds skill to the random and/or strategy games of poker, blackjack and slots as does the shorter term associations discussed above in connection with variations two and three.

Central Determination

Figure 16:
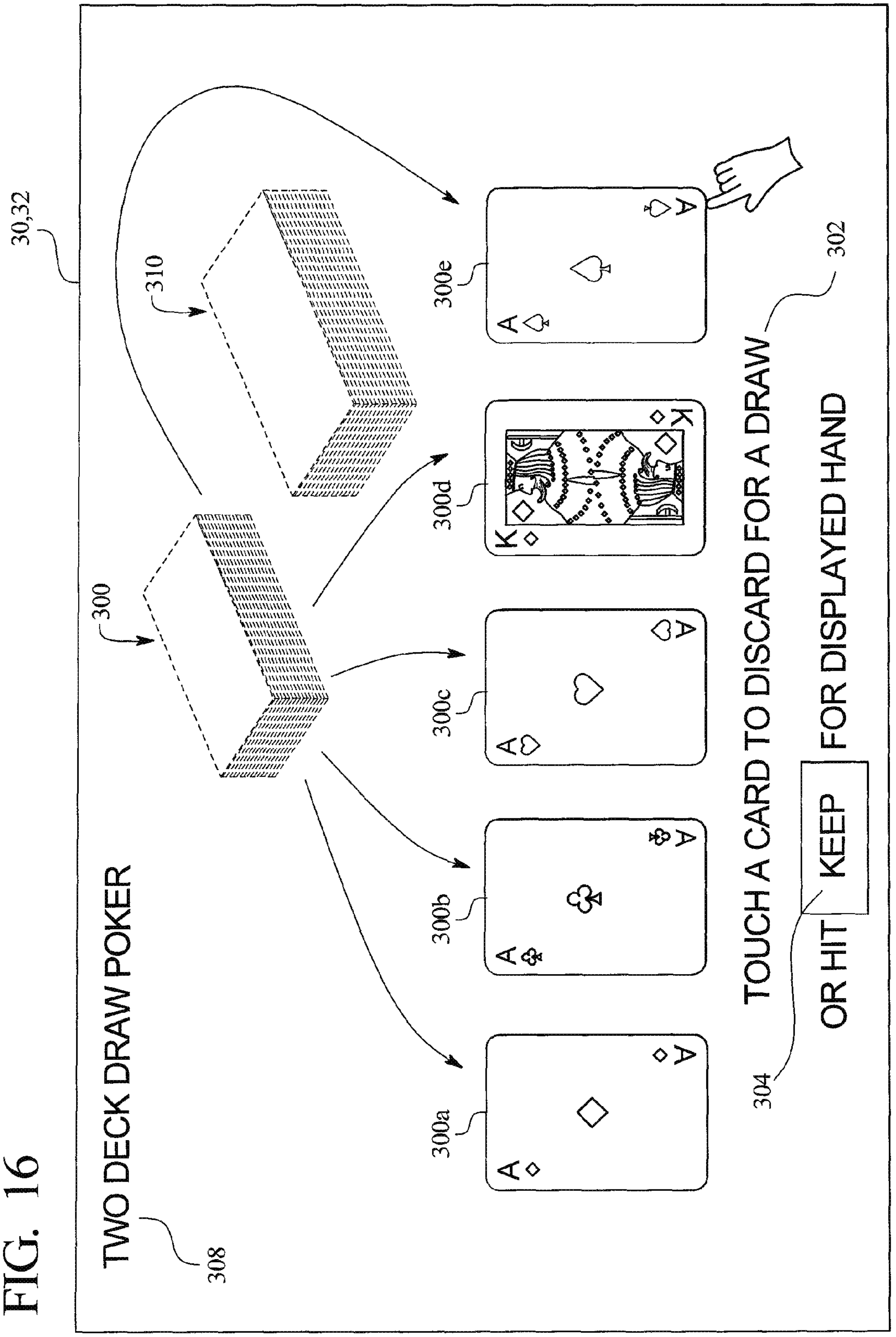
FIGS. 16 and 17 are elevation views of one of the display devices of the present invention showing a draw poker game with central determination outcomes that uses multiple decks of cards.
Figure 17:
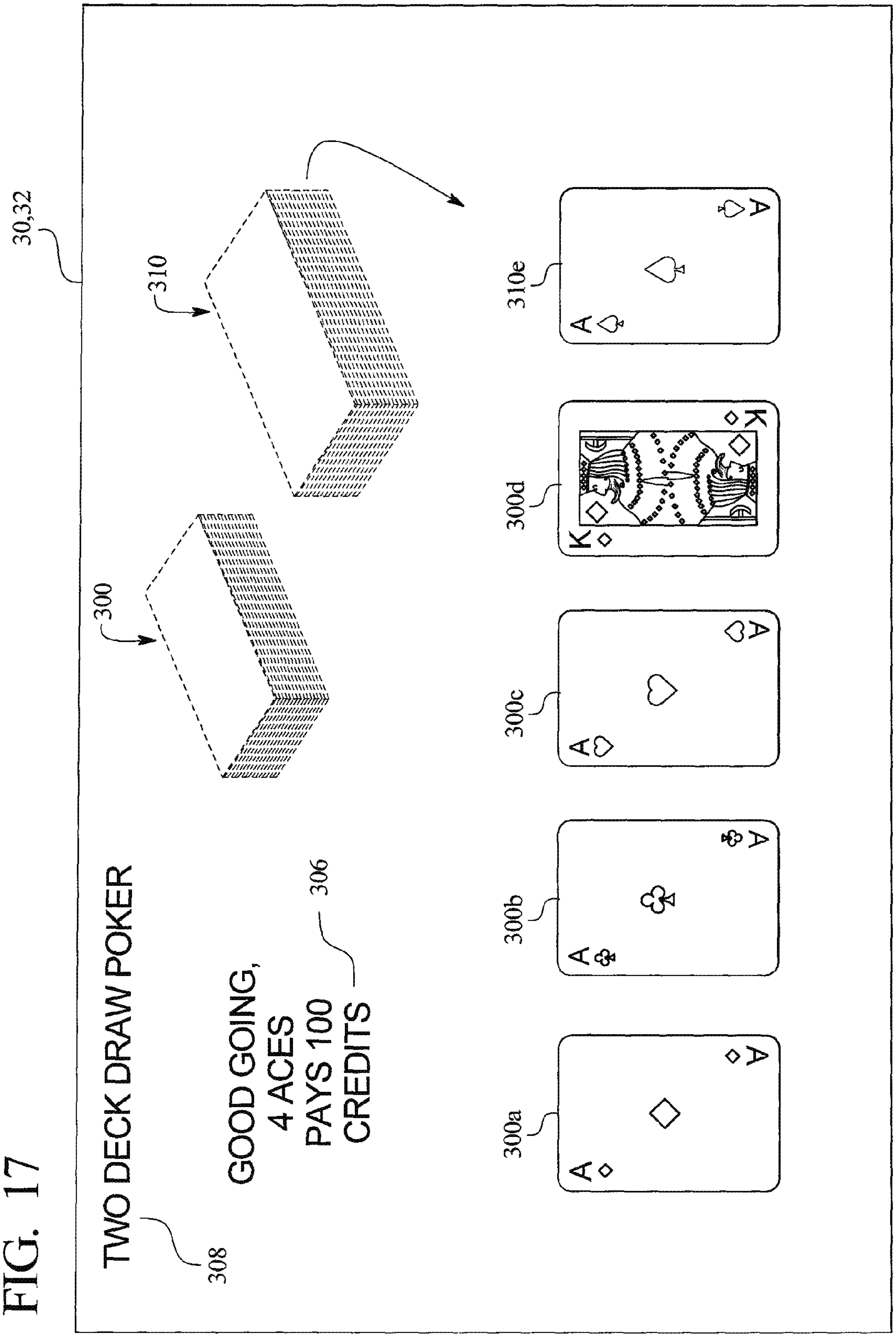

Referring now to FIGS. 16 and 17, any of the lengths of the associations described in connection with FIG. 15 may be implemented in a poker game that uses a central determination method of developing outcomes. Central determination gaming systems are generally known. Many such systems link a plurality of individual gaming terminals via one or more communication links to a central processor or computing system. When a player plays a game on one of the gaming terminals, the game outcome is communicated from the central system. The outcome is displayed to the player in the form of symbols that have been predetermined to yield the outcome.

The central determination method is completely random, just like mechanically generated outcomes. The difference occurs in that with central determination, the outcome is generated randomly independent of the associated combination of symbols presented to the player to yield the outcome. With mechanical systems on the other hand, the combination of symbols actually generates the outcome.

There are a number of advantages to providing centralized determination of game outcomes at individual terminals. Central production or control can assist a casino or other entity in maintaining proper records, controlling gaming, reducing and preventing cheating or electronic or other errors, reducing or eliminating win-loss volatility and the like.

Certain central determination gaming systems maintain one or more predetermined pools or sets of game outcomes. Other central determination gaming systems maintain one or more predetermined pools or sets of random number seeds. The use of random number seeds, in general, reduces the computational load on the central processor of the central determination gaming systems. In those systems, when a player makes a wager on one of the gaming terminals, the central system selects a seed for determining the game outcome, marks the selected seed as used and communicates the selected seed to that individual gaming terminal. The individual game terminal uses the seed to determine the predetermined game combination of symbols.

Central determination is predicated upon providing the player with a combination of symbols that appears to generate the generated outcome. For games of pure luck, such symbol generation is facilitated readily because the player has no control. With games like poker however, which require a degree of strategy and decision making, providing the symbols necessary to generate a previously, randomly determined outcome can become tricky.

Draw poker can yield some tricky situations for central determination. Suppose the player's outcome is generated to be four aces. The player must receive therefore four aces. Suppose the game deals the player two aces initially. One ace is the ace of spades and the other is the ace of diamonds. Suppose also that the other three cards are spades. The player may decide to discard the ace of diamonds attempting to achieve a flush. With a single deck, four aces is now impossible.

The multi-faced cards or multiple decks of the present invention remedy the above-described situation through the use of two decks of cards. Here, even if the player discards the ace of diamonds, the game can replenish the player's hand with three additional aces from a second deck. Importantly, there needs to be enough additional cards, in relation to the total number of cards in the player's hand, to cover any contingency.

FIGS. 16 and 17 show one example of a draw poker game having randomly predetermined outcomes, which may be determined by a processor 38 of gaming device 10 or over a data network by a central processor. The draw poker game is displayed on one of the display devices 30 or 32 of gaming device 10.

In the example, the player is to receive four aces, a insult that has been randomly predetermined. Gaming device 10 displays the winning cards initially to the player on display device 30 or 32. The four aces 300*a*, 300*b*, 300*c* and 300*e* are drawn from a single deck 300 of cards along with a fifth card 300*d*, the king of diamonds.

Displaying the winning hand initially in a draw poker game prevents the player from keeping a hand that is not the predetermined. For example, where four aces are randomly predetermined for the player but only two aces are dealt initially, the player could decide to keep the initially dealt hand, precluding the predetermined result from occurring. Such a case is a realistic possibility if the player, for example, receives a full house of, that is, the other three cards dealt besides the pair of aces are of the same value. By dealing the winning hand initially, gaming device 10 ensures that the player receives the randomly predetermined outcome if the player keeps the initial deal and forgoes any draw cards.

FIG. 16 provides an audio, visual or audiovisual message 302 to the player to press the keep input 304 to keep the initially dealt hand or to press one or more of the cards 300*a* to 300*e* to discard same. As illustrated in FIG. 16, the player foolishly or mistakenly presses and discards the ace of clubs 300*e*. If the game used only the single deck 300, the game would not have the ability to provide an additional ace to complete the player's predetermined outcome, namely, four aces. It should be appreciated that no net negative effect is produced if the player chooses to discard the king of diamonds, the game in the situation can simply provide another can not from deck 300 without disrupting the random by predetermined result.

FIG. 17 illustrates that even though the player discarded a winning card in FIG. 16, because the game uses the two decks 300 and 310, the game can draw the fourth winning card 310*e* from the second deck 310 to complete the player's predetermined winning hand. Audio, visual or audiovisual message 306 informs the player of the player's win.

In an "of a kind" type win, such as four aces, the replacement card, e.g., card 310*e* can be the same card (suit and value) as the discarded card, e.g., card 300*e*, in this case, the ace of spades. Otherwise, the replacement card could be another ace, such as the ace of diamonds, clubs or hearts. In such a case, the player's winning hand would have two of the same card, i.e., two Aces of Diamonds, two Aces of Clubs or two Aces of Hearts. It should therefore be appreciated that the player should know that the game is using two decks 300 and 310 of cards, otherwise the game will not make sense to the player.

In a win such as a straight flush, the replacement card has to be the same (suit and value) as the discarded card. Here again, the player should understand that the game uses two decks, otherwise the player will be confused when the player receives the same card that the player has just discarded. Accordingly, FIGS. 16 and 17 display an audio, visual or audiovisual message 308 informing the player that the game is a two deck draw poker game.

The central determination associations do not require player input for activation. Gaming device 10 or a central processor controlling same calls upon the additional card when needed. The game may or may not inform the player that multiple decks are being used, however, it is desirable in one respect to inform the player of such so that the player is not confused when the player discards two aces and receives three more.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is claimed as follows:

1. A gaming system comprising:

at least one display device;

at least one input device;

at least one processor; and at least one memory device storing a plurality of instructions which, when executed by the at least one processor, cause the at least one processor to operate with the at least one display device and the at least one input device to:

for a play of a card game, the card game including a virtual deck of a plurality of playing cards, a first quantity of the playing cards each including one of a plurality of different suit and value combinations and a second quantity of the playing cards each including two of the plurality of different suit and value combinations:

(a) deal a plurality of the playing cards from the deck of playing cards;

(b) for each of the dealt playing cards that is one of the first quantity of the playing cards, display the suit and value combination of said playing card;

(c) for at least one of the dealt playing cards that is one of the second quantity of the playing cards:

(i) display a first one of the suit and value combinations of said at least one dealt playing card and not display a second one of the suit and value combinations of said at least one dealt playing card; and (ii) if a designated player input is received, display the second one of the suit and value combinations of said at least one dealt playing card;

(d) evaluate the displayed suit and value combinations of the dealt playing cards and determine whether any awards are associated with said displayed suit and value combinations, and (e) display any determined awards.

2. The gaming system of claim 1, wherein the plurality of instructions, when executed by the at least one processor, cause the at least one processor to operate with the at least one display device to, after the designated player input is received, not display the first one of the suit and value combinations of said at least one dealt playing card.

3. The gaming system of claim 1, wherein the plurality of instructions, when executed by the at least one processor, cause the at least one processor to operate with the at least one display device to, after the designated player input is received, display the second one of the suit and value combinations of said at least one dealt playing card in addition to the displayed first one of the suit and value combinations of said at least one dealt playing card.

4. The gaming system of claim 1, wherein the plurality of instructions, when executed by the at least one processor, cause the at least one processor to operate with the at least one display device to, if a preview input is received before the designated player input is received, display the second one of the suit and value combinations of said at least one dealt playing card and, thereafter, enable the player to input the designated player input.

5. The gaming system of claim 4, wherein the plurality of instructions, when executed by the at least one processor, cause the at least one processor to operate with the at least one display device to, if the preview input is received before the designated player input is received, after receipt of the designated player input, display the second one of the suit and value combinations of said at least one dealt playing card and not display the first one of the suit and value combinations of said at least one dealt playing card.

6. The gaming system of claim 4, wherein the plurality of instructions, when executed by the at least one processor, cause the at least one processor to enable the player to input the preview input upon placement of an additional wager.

7. The gaming system of claim 1, wherein the first quantity of the playing cards is zero, and the second quantity of the playing cards is equal to a total quantity of the playing cards in the virtual deck of playing cards.

8. The gaming system of claim 1, wherein each of the second quantity of the playing cards includes two different suit and value combinations of the plurality of different suit and value combinations.

9. A method of operating a gaming system, said method comprising:

for a play of a card game, the card game including a virtual deck of a plurality of playing cards, a first quantity of the playing cards each including one of a plurality of different suit and value combinations and a second quantity of the playing cards each including two of the plurality of different suit and value combinations:

(a) causing at least one processor to execute a plurality of instructions stored in at least one memory device to deal a plurality of the playing cards from the deck of playing cards;

(b) for each of the dealt playing cards that is one of the first quantity of the playing cards, causing the at least one processor to execute the plurality of instructions to operate with at least one display device to display the suit and value combination of said playing card;

(c) for at least one of the dealt playing cards that is one of the second quantity of the playing cards:

(i) causing the at least one processor to execute the plurality of instructions to operate with the at least one display device to display a first one of the suit and value combinations of said at least one dealt playing card and not display a second one of the suit and value combinations of said at least one dealt playing card; and (ii) if a designated player input is received, causing the at least one processor to execute the plurality of instructions to operate with the at least one display device to display the second one of the suit and value combinations of said at least one dealt playing card;

(d) causing the at least one processor to execute the plurality of instructions to evaluate the displayed suit and value combinations of the dealt playing cards and determine whether any awards are associated with said displayed suit and value combinations, and (e) causing the at least one processor to execute the plurality of instructions to operate with the at least one display device to display any determined awards.

10. The method of claim 9, which includes causing the at least one processor to execute the plurality of instructions to operate with the at least one display device to, after the designated player input is received, not display the first one of the suit and value combinations of said at least one dealt playing card.

11. The method of claim 9, which includes causing the at least one processor to execute the plurality of instructions to operate with the at least one display device to, after the designated player input is received, display the second one of the suit and value combinations of said at least one dealt playing card in addition to the displayed first one of the suit and value combinations of said at least one dealt playing card.

12. The method of claim 9, which includes causing the at least one processor to execute the plurality of instructions to operate with the at least one display device to, if a preview input is received before the designated player input is received, display the second one of the suit and value combinations of said at least one dealt playing card and, thereafter, enable the player to input the designated player input.

13. The method of claim 12, which includes causing the at least one processor to execute the plurality of instructions to operate with the at least one display device to, if the preview input is received before the designated player input is received, after receipt of the designated player input, display the second one of the suit and value combinations of said at least one dealt playing card and not display the first one of the suit and value combinations of said at least one dealt playing card.

14. The method of claim 12, which includes causing the at least one processor to execute the plurality of instructions to operate with at least one input device to enable the player to input the preview input upon placement of an additional wager.

15. The method of claim 10, wherein the first quantity of the playing cards is zero, and the second quantity of the playing cards is equal to a total quantity of the playing cards in the virtual deck of playing cards.

16. The method of claim 10, wherein each of the second quantity of the playing cards includes two different suit and value combinations of the plurality of different suit and value combinations.

17. The method of claim 10, which is provided through a data network.

18. The method of claim 17, wherein the data network is an internet.

19. A non-transitory computer readable medium including a plurality of instructions which, when executed by at least one processor, cause the at least one processor to:

for a play of a card game, the card game including a virtual deck of a plurality of playing cards, a first quantity of the playing cards each including one of a plurality of different suit and value combinations and a second quantity of the playing cards each including two of the plurality of different suit and value combinations:

(a) deal a plurality of the playing cards from the deck of playing cards;

(b) for each of the dealt playing cards that is one of the first quantity of the playing cards, cause at least one display device to display the suit and value combination of said playing card;

(c) for at least one of the dealt playing cards that is one of the second quantity of the playing cards:

(i) cause the at least one display device to display a first one of the suit and value combinations of said at least one dealt playing card and not display a second one of the suit and value combinations of said at least one dealt playing card; and (ii) if a designated player input is received, cause the at least one display device to display the second one of the suit and value combinations of said at least one dealt playing card;

(d) evaluate the displayed suit and value combinations of the dealt playing cards and determine whether any awards are associated with said displayed suit and value combinations, and (e) cause the at least one display device to display any determined awards.

20. The non-transitory computer readable medium of claim 19, wherein the plurality of instructions, when executed by the at least one processor, cause the at least one processor to cause the at least one display device to, after the designated player input is received, not display the first one of the suit and value combinations of said at least one dealt playing card.

21. The non-transitory computer readable medium of claim 19, wherein the plurality of instructions, when executed by the at least one processor, cause the at least one processor to cause the at least one display device to, after the designated player input is received, display the second one of the suit and value combinations of said at least one dealt playing card in addition to the displayed first one of the suit and value combinations of said at least one dealt playing card.

22. The non-transitory computer readable medium of claim 19, wherein the plurality of instructions, when executed by the at least one processor, cause the at least one processor to cause the at least one display device to, if a preview input is received before the designated player input is received, display the second one of the suit and value combinations of said at least one dealt playing card and, thereafter, enable the player to input the designated player input.

23. The non-transitory computer readable medium of claim 22, wherein the plurality of instructions, when executed by the at least one processor, cause the at least one processor to cause the at least one display device to, if the preview input is received before the designated player input is received, after receipt of the designated player input, display the second one of the suit and value combinations of said at least one dealt playing card and not display the first one of the suit and value combinations of said at least one dealt playing card.

24. The non-transitory computer readable medium of claim 22, wherein the plurality of instructions, when executed by the at least one processor, cause the at least one processor to enable the player to input the preview input upon placement of an additional wager.

25. The non-transitory computer readable medium of claim 19, wherein the first quantity of the playing cards is zero, and the second quantity of the playing cards is equal to a total quantity of the playing cards in the virtual deck of playing cards.

26. The non-transitory computer readable medium of claim 19, wherein each of the second quantity of the playing cards includes two different suit and value combinations of the plurality of different suit and value combinations.

* * * * *